(12) United States Patent
Akl et al.

(10) Patent No.: US 11,991,615 B2
(45) Date of Patent: May 21, 2024

(54) REWRITING BAP HEADERS IN IAB

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/451,770

(22) Filed: Oct. 21, 2021

(65) Prior Publication Data
US 2022/0132393 A1  Apr. 28, 2022

Related U.S. Application Data

(60) Provisional application No. 63/104,353, filed on Oct. 22, 2020.

(51) Int. Cl.
*H04W 40/24* (2009.01)
*H04W 88/14* (2009.01)
*H04W 92/24* (2009.01)

(52) U.S. Cl.
CPC ......... *H04W 40/248* (2013.01); *H04W 88/14* (2013.01); *H04W 92/24* (2013.01)

(58) Field of Classification Search
CPC ... H04W 40/248; H04W 88/14; H04W 92/24; H04W 84/047; H04W 88/085; H04W 92/20; H04W 40/22; H04L 45/02; H04L 45/04; H04L 45/74
See application file for complete search history.

(56) References Cited

U.S. PATENT DOCUMENTS

| 2022/0286938 A1* | 9/2022 | Wang | H04W 76/19 |
| 2022/0393966 A1* | 12/2022 | Eriksson | H04L 45/20 |
| 2023/0007565 A1* | 1/2023 | Mildh | H04W 40/22 |

OTHER PUBLICATIONS

International Search Report and Written Opinion—PCT/US2021/056222—ISA/EPO—dated Feb. 23, 2022.
(Continued)

*Primary Examiner* — Luat Phung
(74) *Attorney, Agent, or Firm* — Procopio, Cory, Hargreaves & Savitch

(57) ABSTRACT

Method and apparatus to rewrite BAP headers in IAB networks. The apparatus receives, from a second base station, a routing configuration indicating a mapping between a first routing ID and a second routing ID. The apparatus receives a packet with a packet header indicating the first routing ID. The apparatus determines the second routing ID based on the routing configuration mapping the first routing ID in the packet header to the second routing ID. The apparatus modifies, based on a determination of the second routing ID, the packet header to replace the first routing ID with the second routing ID. The apparatus transmits the packet based on the second routing ID.

30 Claims, 15 Drawing Sheets

(56) References Cited

OTHER PUBLICATIONS

Qualcomm (Rapporteur): "Email Discussion [108#51][IAB]: BAP Functional View", 3GPP Draft, 3GPP TSG-RAN WG2 Meeting #109-e, R2-2000481, 3rd Generation Partnership Project (3GPP), Mobile Competence Centre, vol. RAN WG2, No. Electronic meeting, Feb. 24, 2020-Mar. 6, 2020 Feb. 13, 2020 (Feb. 13, 2020), pp. 1-7, XP051848556, Retrieved from the Internet: URL: https://ftp.3gpp.org/tsg_ran/WG2_RL2/TSGR2_109_e/Docs/R2-2000481.ZipR2-200048 Email Discussion on BAP Functional View_Summary.docx [Retrieved on Feb. 13, 2020] the whole Document.

ZTE., et al.," (TP for NR_IAB BL CR for TS 38.473): Routing Selection Configuration at Donor DU", 3GPP Draft, 3GPP TSG-RAN WG3 #107bis-e, R3-202018, 3rd Generation Partnership Project (3GPP), Mobile Competence Centre, 650, Route Des Lucioles, F-06921 Sophia-Antipolis Cedex, France, vol. RAN WG3, No. Online, Apr. 20, 2020-Apr. 30, 2020 Apr. 10, 2020 (Apr. 10, 2020), 41 Pages, XP051873965, Retrieved from the Internet: URL: https://ftp.3gpp.org/tsg_ran/WG3_lu/TSGR3_107bis_e/Docs/R3-202018.zip R3-202018.doc [Retrieved on Apr. 10, 2020] 2nd Page, Figure 8.x.2.1.

* cited by examiner

REWRITING BAP HEADERS IN IAB

CROSS REFERENCE TO RELATED APPLICATION(S)

This application claims the benefit of and priority to U.S. Provisional Application Ser. No. 63/104,353, entitled "Rewriting BAP Headers in IAB" and filed on Oct. 22, 2020, which is expressly incorporated by reference herein in its entirety.

TECHNICAL FIELD

The present disclosure relates generally to communication systems, and more particularly, to a configuration to rewrite backhaul adaptation protocol (BAP) headers in integrated access backhaul (IAB) networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first base station. The device may be a processor and/or a modem at a first base station or the first base station itself. The apparatus receives, from a second base station, a routing configuration indicating a mapping between a first routing identifier (ID) and a second routing ID. The apparatus receives a packet with a packet header indicating the first routing ID. The apparatus determines the second routing ID based on the routing configuration mapping the first routing ID in the packet header to the second routing ID. The apparatus modifies, based on a determination of the second routing ID, the packet header to replace the first routing ID with the second routing ID. The apparatus transmits the packet based on the second routing ID.

In an aspect of the disclosure, a method, a computer-readable medium, and an apparatus are provided. The apparatus may be a device at a second base station. The device may be a processor and/or a modem at a second base station or the second base station itself. The apparatus configures a first base station to modify a packet header of a packet in which the packet header indicates a first routing identifier (ID). The apparatus transmits, to the first base station, a routing configuration indicating a mapping between the first routing ID and a second routing ID.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
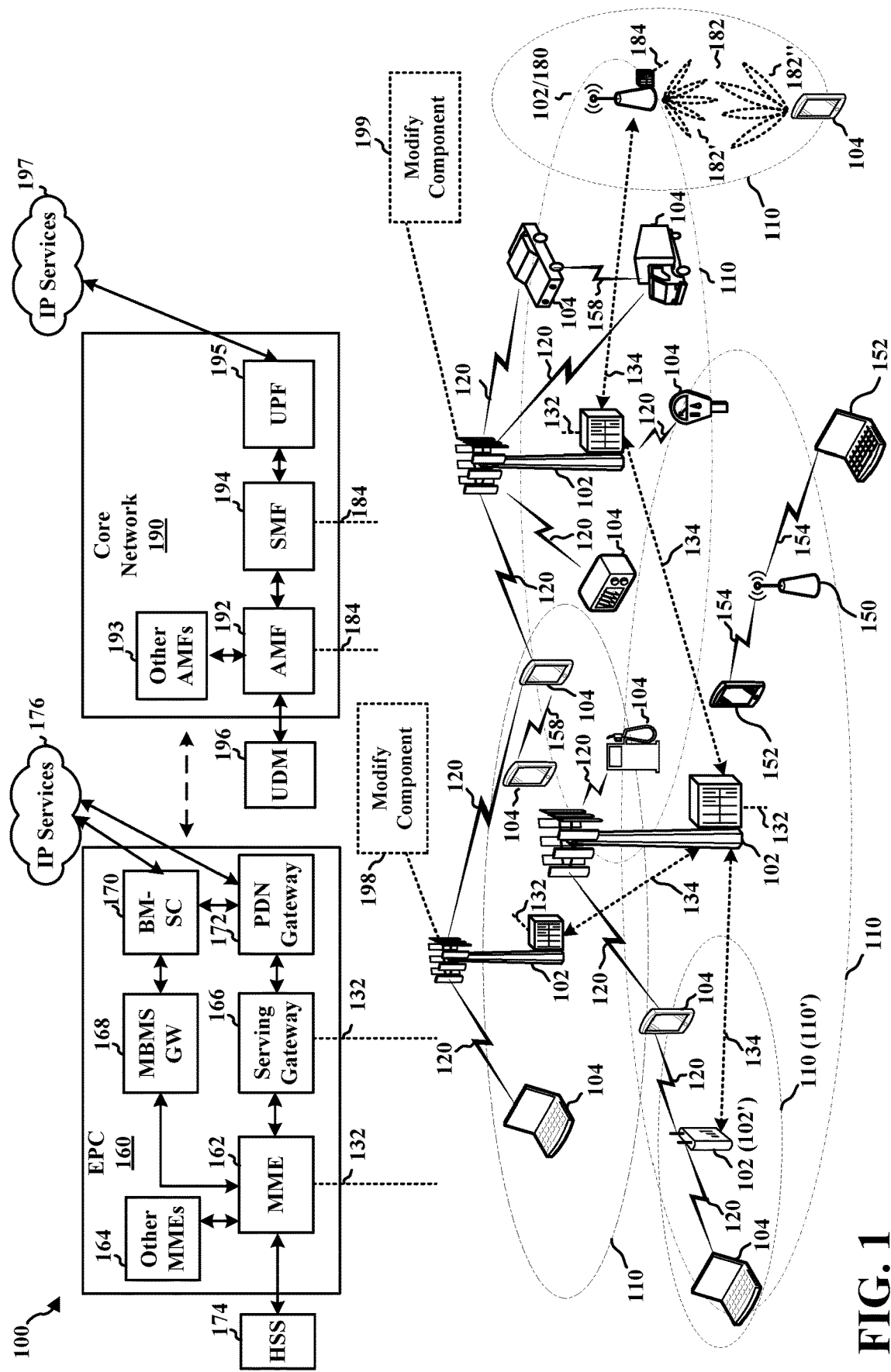
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the first base station 180 may be configured to modify a mapping configuration between BAP routing IDs. For example, the first base station 180 may comprise a modify component 198 configured to modify a mapping configuration between BAP routing IDs. The first base station 180 may receive, from a second base station 180, a routing configuration indicating a mapping between a first routing ID and a second routing ID. The first base station 180 may receive a packet with a packet header indicating the first routing ID. The first base station 180 may determine the second routing ID based on the routing configuration mapping the first routing ID in the packet header to the second routing ID. The first base station 180 may modify, based on a determination of the second routing ID, the packet header to replace the first routing ID with the second routing ID. The first base station may transmit the packet based on the second routing ID.

Referring again to FIG. 1, in certain aspects, the second base station 180 may be configured to configure a base station to modify a mapping configuration between BAP routing IDs. For example, the second base station 180 may comprise a modify component 199 configured to configure a base station to modify a mapping configuration between BAP routing IDs. The second base station 180 may configure a first base station 180 to modify a packet header of a packet in which the packet header indicates a first routing ID. The second base station 180 may transmit, to the first base station 180, a routing configuration indicating a mapping between the first routing ID and a second routing ID.

Although the following description may be focused on 5G NR, the concepts described herein may be applicable to other similar areas, such as LTE, LTE-A, CDMA, GSM, and other wireless technologies.

Figure 2:
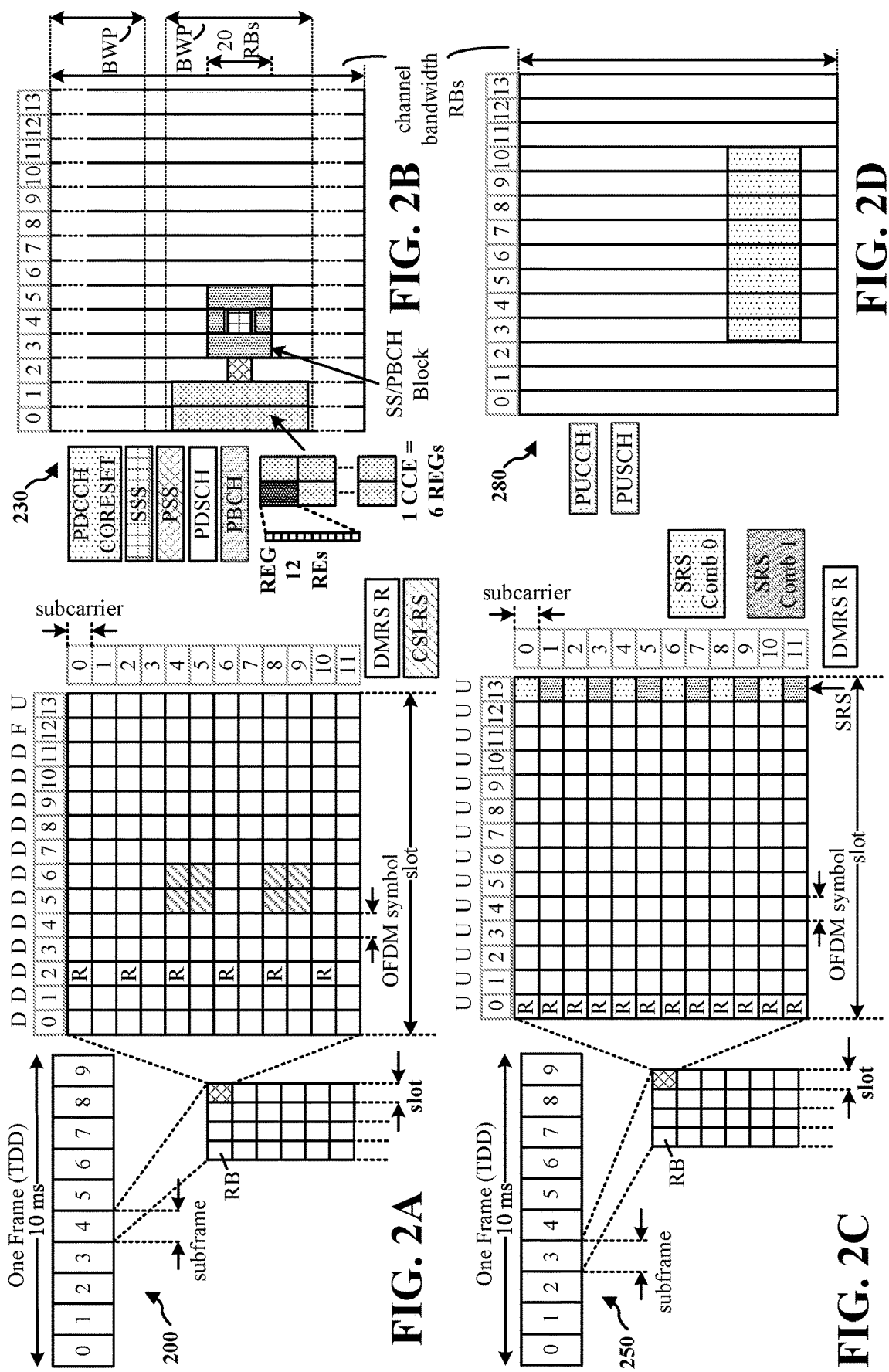
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
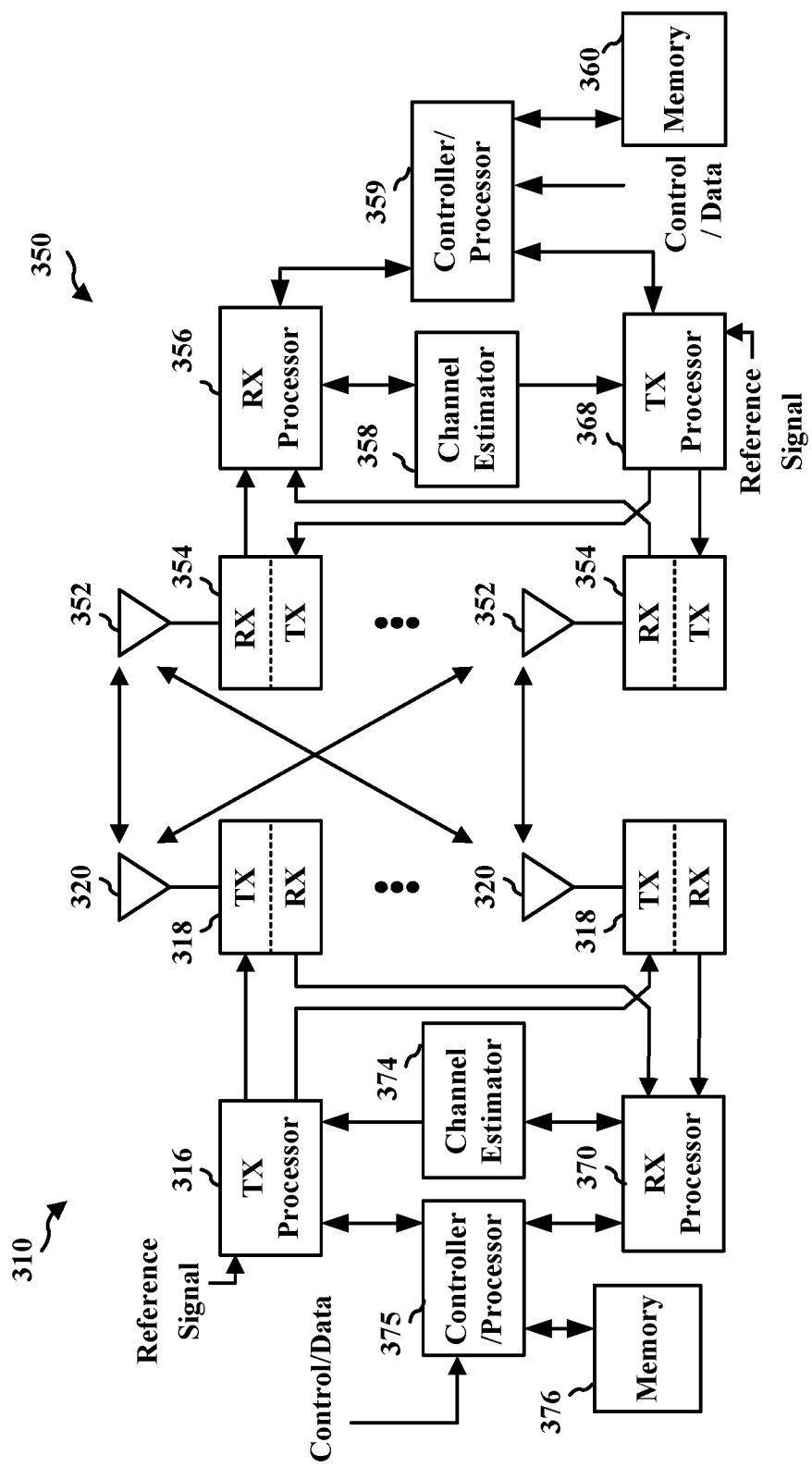
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 or 199 of FIG. 1.

Figure 4:
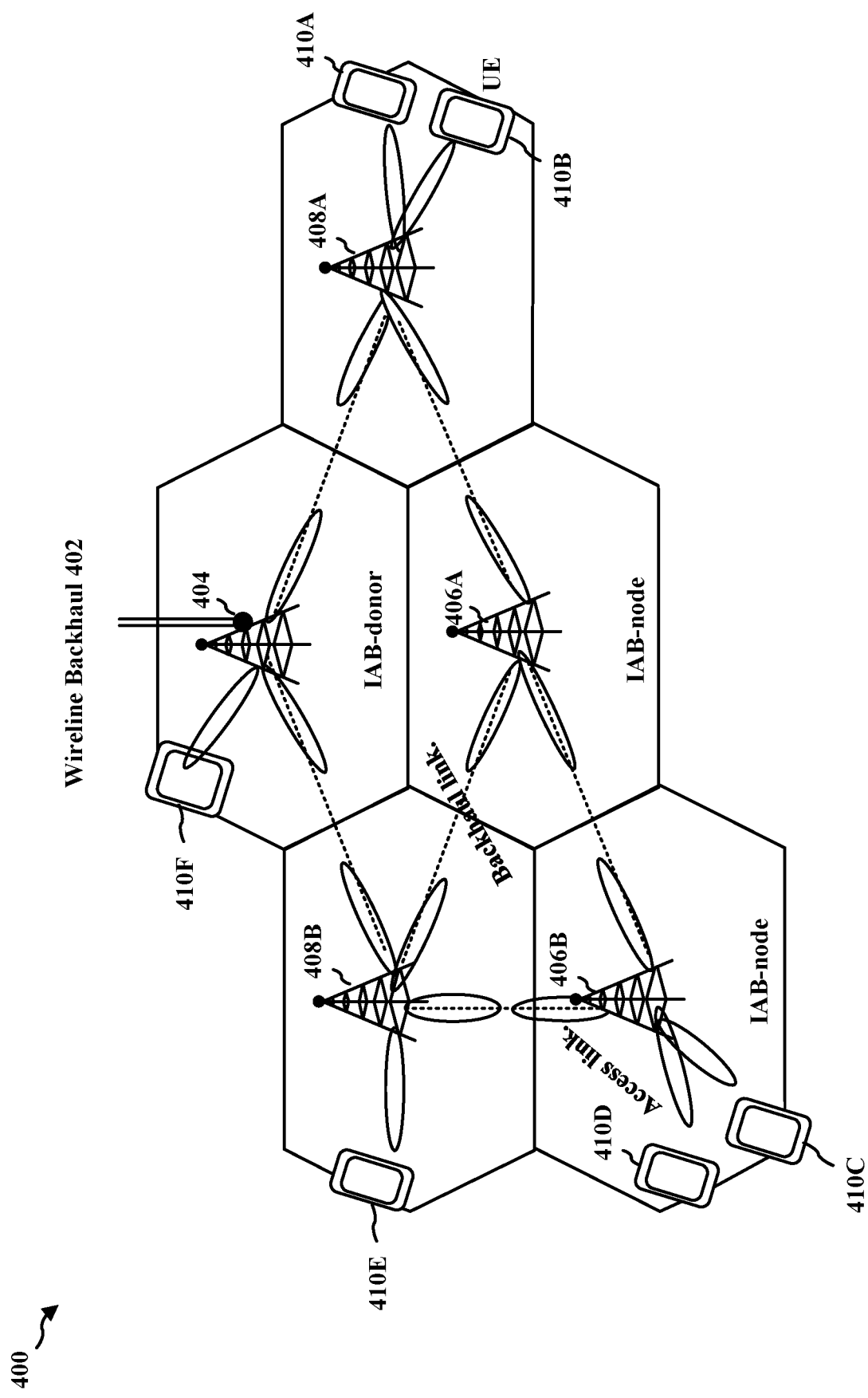
FIG. 4 is a first diagram illustrating an IAB network.

FIG. 4 is a first diagram 400 illustrating an IAB network. The IAB network provides access network functionality between access nodes (ANs) 404, 406A, 406B, 408A, 408B and ANs/UEs 410A, 410B, 410C, 410D, 410E, and 410F, and backhaul network functionality between the ANs. The ANs include an IAB-donor 404, which has a wireline connection to the core network 402, and IAB-nodes 406A and 406B, which operate wirelessly and relay traffic to/from IAB-donors through one or more AN hops 408A and 408B. The IAB ANs share resources between the access and backhaul. That is, the resources used for access communication between the ANs and ANs/UEs are also used for backhaul communication between the ANs.

Figure 5:
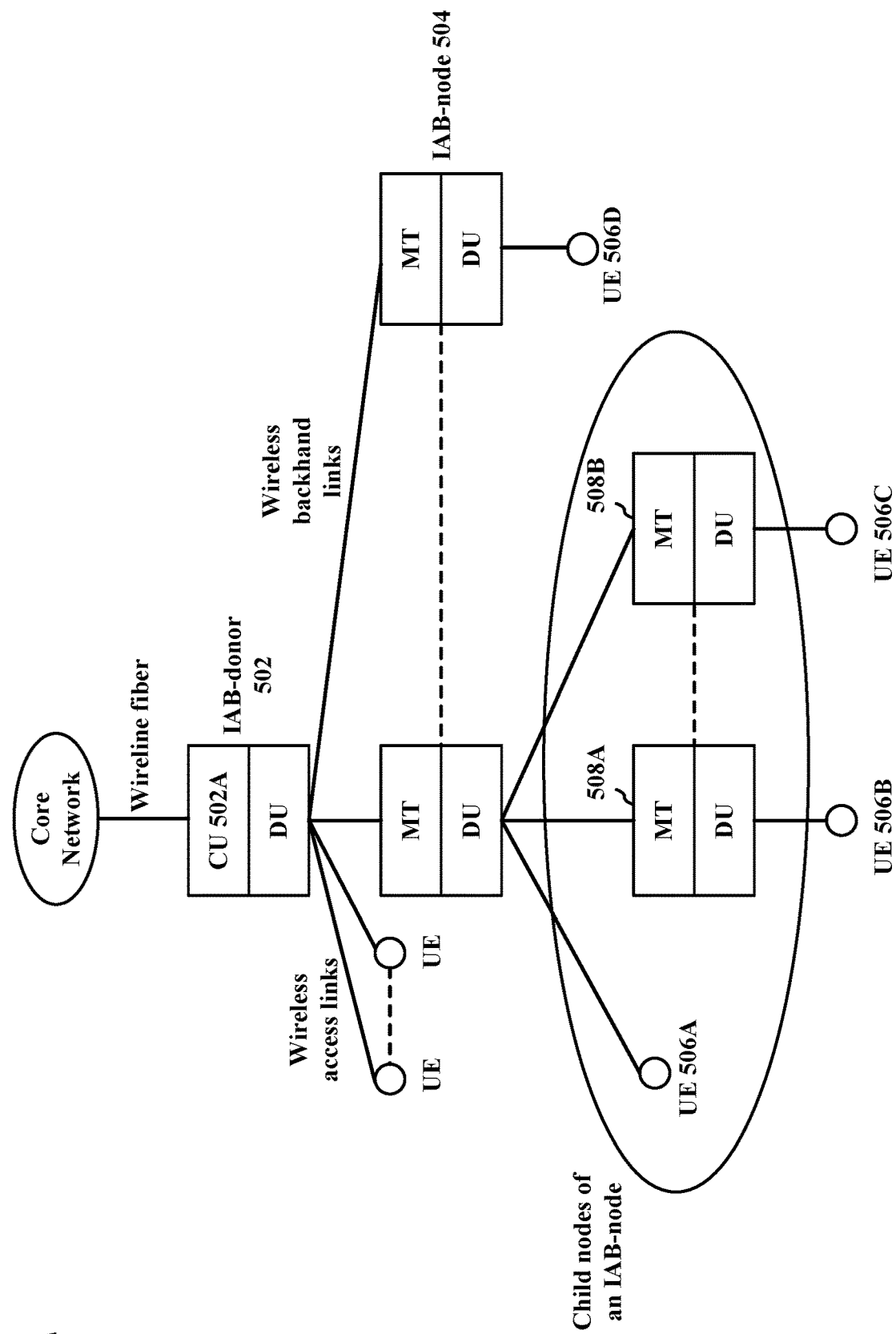
FIG. 5 is a second diagram illustrating an IAB network.

FIG. 5 is a second diagram 500 illustrating an IAB network. In an IAB network, there are two types of base stations: IAB-donors (e.g., IAB-donor 502) and IAB-nodes (e.g., IAB-node 504). IAB-donors are an enhanced gNB with functions to control the IAB network. IAB-donors include a central unit (CU) (e.g., CU 502A) that controls the whole IAB network through configuration. The CU holds RRC and packet data convergence protocol (PDCP) layer functions. The IAB-donors further include a distributed unit (DU) (e.g., DU 502B) that schedules child nodes (e.g., UEs 506A, 506B, 506C, 506D and/or ANs 508A, 508B) of the IAB-donor. The DU holds radio link control (RLC), media access control (MAC), a physical (PHY) layer functions. The IAB-node 504 is an L2 relay node that includes mobile termination (MT) and DU functions. The MT is scheduled (similar to like a UE) by its parent IAB-node or IAB-donor. The DU schedules child nodes (UEs and/or ANs) of the IAB-node.

Figure 6:
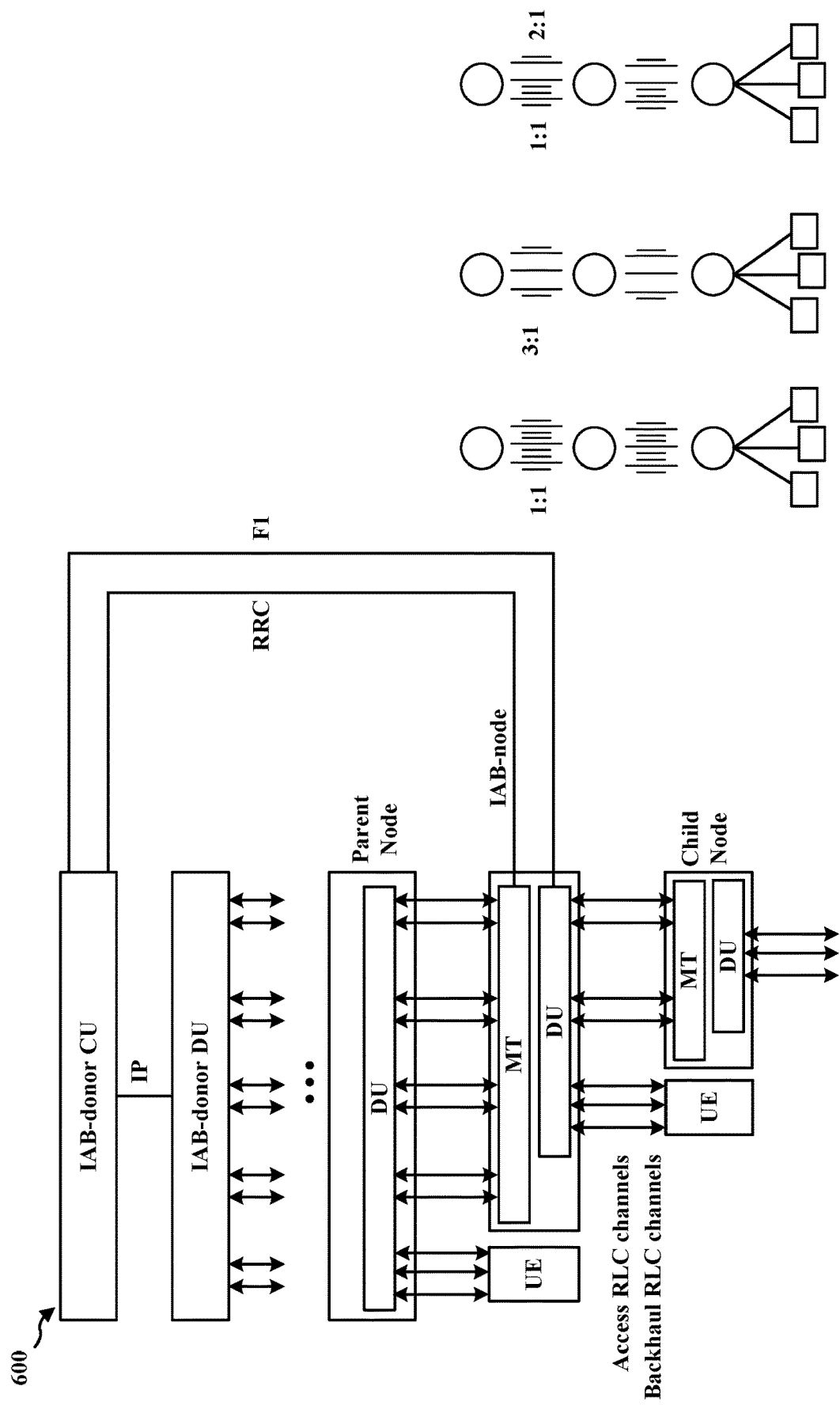
FIG. 6 is a diagram illustrating radio link control (RLC) channels in an IAB network.

FIG. 6 is a diagram 600 illustrating RLC channels in an IAB network. As discussed supra, the IAB network provides both access network functionality and backhaul network functionality. Per the access network functionality, IAB ANs may communicate with other UEs and/or MTs of other IAB ANs through access RLC channels. Per the backhaul network functionality, IAB ANs may route traffic to other ANs through backhaul RLC channels. Access RLC channels include UE-to-DU/DU-to-UE, carrying PDCP for RRC or data radio bearers (DRBs), and MT-to-DU/DU-to-MT, carrying PDCP for RRC (or DRBs). Backhaul RLC channels include MT-to-DU/DU-to-MT, carrying backhaul adaptation protocol (BAP) messages for backhauling access traffic. Different possible mappings are allowed between UE/MT DRBs and backhaul RLC channels, such as illustrated with 1:1 UE DRBs to backhaul RLC channels (i.e., each UE DRB mapped to one backhaul RLC channel), 3:1 UE DRBs to backhaul RLC channels (i.e., three UE DRBs mapped to one backhaul RLC channel), and 1:1 UE DRBs to backhaul RLC channels and 2:1 UE DRBs to backhaul RLC channels (i.e., one UE DRB mapped to a first backhaul RLC channel and two UE DRBs mapped to a second backhaul RLC channel) mappings. The 1:1 mapping allows particular UE DRBs to be prioritized over others, whereas for the 2:1 and 3:1 mappings, UE DRBs in the same backhaul RLC channel may not be prioritized over each other.

Figure 7:
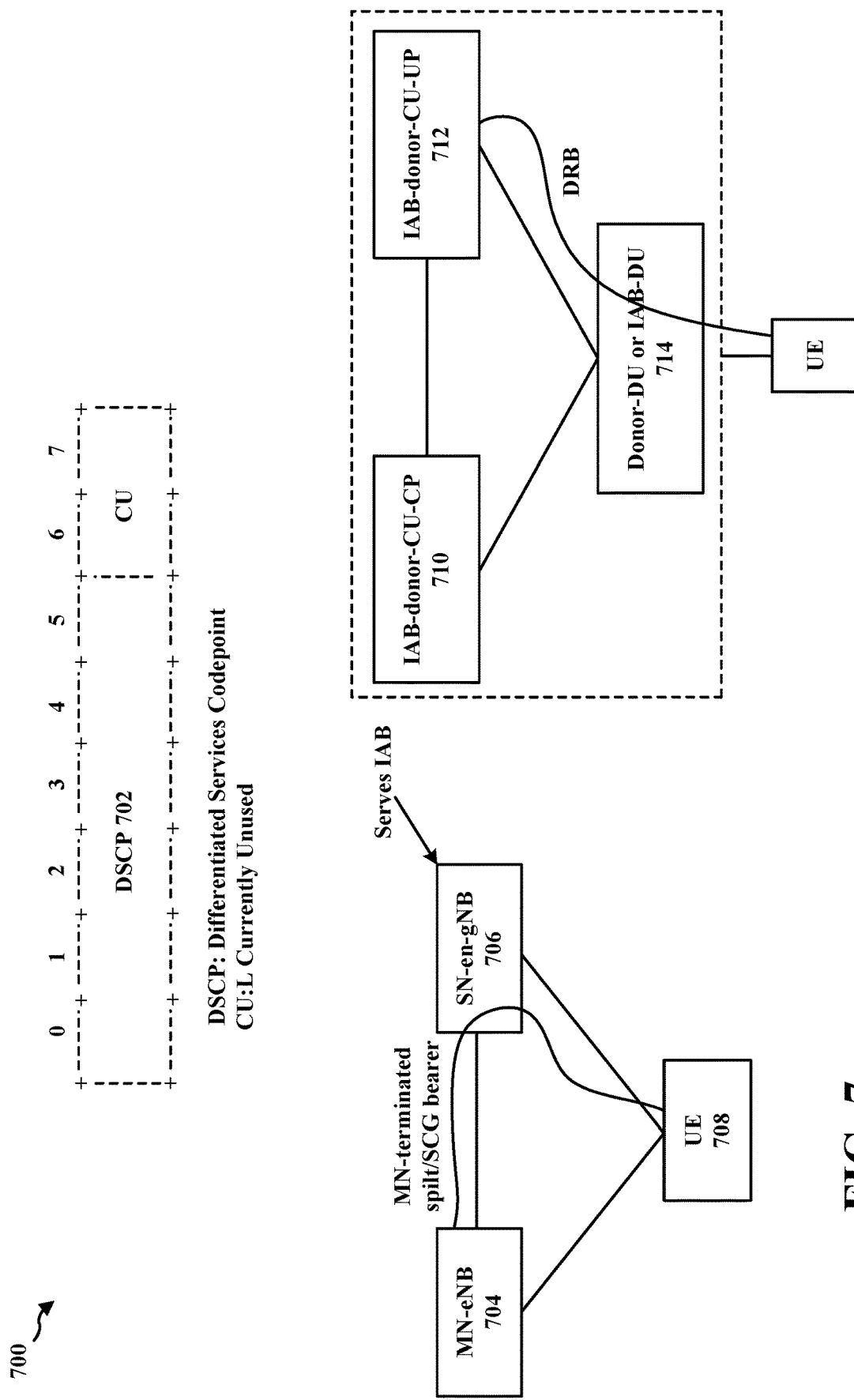
FIG. 7 is a diagram illustrating quality of service (QoS) mapping information within an IAB network.

FIG. 7 is a diagram 700 illustrating QoS mapping information within an IAB network. The QoS mapping information includes a differentiated services codepoint (DSCP) 702 and an Internet protocol (IP) v6 (IPv6) flow label. Differentiated services are intended to provide a framework and building blocks to enable deployment of scalable service discrimination on the Internet. In the packet forwarding path, differentiated services (DS) are realized by mapping the DSCP contained in a field in the IP packet header to a particular forwarding treatment, or per-hop behavior (PHB), at each AN along its path. Six bits of the DS field are used as the DSCP to select the PHB a packet experiences at each node. The two-bit CU field is current reserved. The DSCP field is defined as an unstructured field to facilitate the definition of future per-hop behaviors. With some exceptions, the mapping of DSCPs to PHBs should be configurable. A DS-compliant node should support the logical equivalent of a configurable mapping table from DSCPs to PHBs.

The IPv6 flow label (referred to herein as IP flow label) includes a 20-bit flow label field in the IPv6 header that is used by an AN to label packets of a flow. From the viewpoint of the network layer, a flow is a sequence of packets sent from a particular source to a particular unicast, anycast, or multicast destination that an AN desires to label as a flow. A typical definition of a flow for this purpose is any set of packets carrying the same 5-tuple of {destination address, source address, protocol, destination port, source port}. There are cases in which the complete 5-tuple for all packets is not readily available to a forwarding AN, in particular for fragmented packets. In such cases, a flow can be defined by fewer IPv6 header fields, typically using only the 2-tuple {destination address, source address}. The usage of the 3-tuple of the flow label, source address, and destination address fields enables efficient IPv6 flow classification, where only IPv6 main header fields in fixed positions are used. Packets may be processed in a flow-specific manner. To enable flow-label-based classification, source nodes may assign each unrelated transport connection and application data stream to a new flow.

As illustrated in FIG. 7, a UE 708 may be dual connected to a master node (MN) eNB 704 and a secondary gNB (an IAB-donor) 708 that manages IAB. For each requested E-UTRAN radio access bearer (E-RAB) configured as MN terminated split bearer/secondary cell group (SCG) bearer, if the QoS mapping information information element (IE) is contained in the general packet radio service (GPRS) tunnelling protocol (GTP) tunnel endpoint IE in the secondary gNB (SgNB) additional/modification request acknowledge message, the master eNB (MeNB) 704 (also referred to as MN-eNB) may, if supported, use the IE to set the DSCP and/or flow label fields for the downlink IP packets which are transmitted from the MeNB 704 to a secondary node (SN) enhanced gNB 706 (SN-en-gNB) (serving the IAB) through the GTP tunnels indicated by the GTP tunnel endpoint IE. The SN donor 706 configures a mapping of the received packets from the MN-eNB 704 based on the IP header fields to a route via the IAB backhaul transport.

For each requested DRB, if the QoS mapping information IE is contained in the DL UP parameters IE in the bearer contact setup/modification request message, the gNB CU for user plane (UP) (gNB-CU-UP) shall use the IE to set the DSCP and/or flow label fields in the downlink IP packets that are transmitted through the GTP tunnels indicated by the UP transport layer information IE. A downlink mapping is configured at IAB-donor-DU based on the IP header fields to a BAP route and egress backhaul RLC channel.

A UE may be connected to an IAB-network. The IAB-donor may setup a DRB for the UE. The DRB flows between the IAB-donor-CU and the UE. In some aspects, the IAB-donor-CU may configure a downlink mapping at a donor-DU as previously described. In some aspects, the IAB-donor-CU may configure IP header fields with DSCP/IPv6 flow labels and may send packets to the donor-DU as previously described. In some aspects, the IAB-donor-CU may include the CU-CP 710 and one or more CU-Ups 712. In such aspects, a DRB flows between a CU-UP and the UE as previously described, for example, at paragraph [0067]. The CU-CP may perform bearer setup per DRB at a CU-UP. The CU-CP may configure QoS mapping information at the CU-UP for each requested DRB as previously described. The CU-UP may also configure the IP header fields based on the QoS mapping info as described. The downlink mapping may be configured by the CU-CP at the donor-DU as previously described.

The IAB-donor CU may include a IAB-donor CU for the control plane (CP) (IAB-donor-CU-CP) and one or more IAB-donor CUs for the user plane (UP) (IAB-donor-CU-UPs). A DRB flow may be between a IAB-donor-CU-UP through a IAB-donor-DU or IAB-DU to/from a UE. The IAB-donor-CU-UP 712 inserts within an IP packet QoS mapping information, which includes the DSCP and the IP flow label. Based on the QoS mapping information, the IAB-donor-CU-CP 710 configures a routing path for the IAB-donor-DU 714, so when the IAB-donor-DU receives an IP packet, the IAB-donor-DU 714 decides how to route the traffic.

Figure 8:
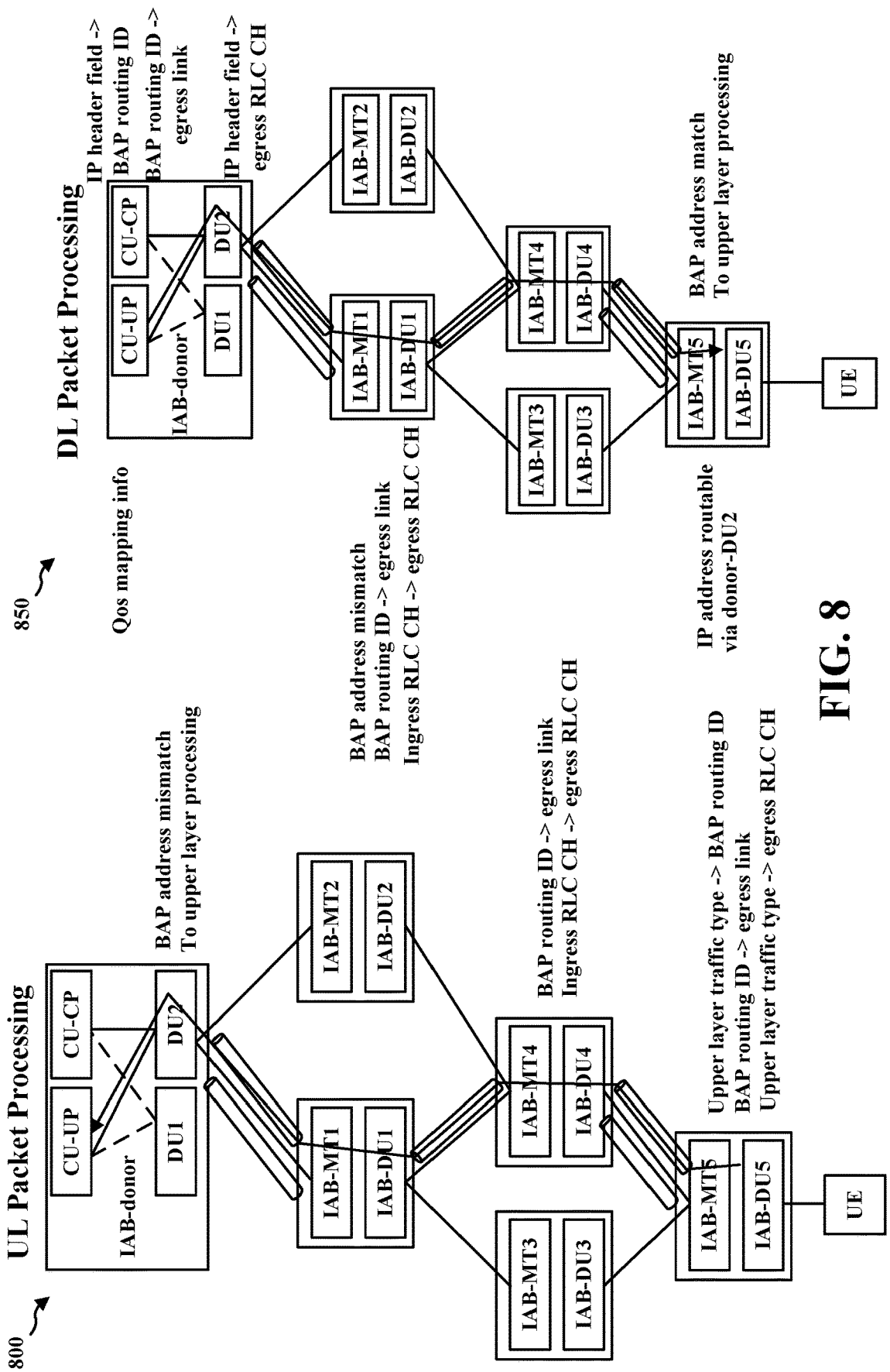
FIG. 8 is a diagram illustrating an IP/BAP configuration.

FIG. 8 is a diagram illustrating IP/BAP configurations 800 and 850. As discussed supra, for DL packet processing in 850, the IAB-donor-CU[-UP] (e.g., IAB donor 1 802A or IAB donor 2 802B) inserts within an IP packet QoS mapping information, which includes the DSCP and the IP flow label. Based on the QoS mapping information, the IAB-donor-CU [-CP] configures a routing path for a downlink mapping at the IAB-donor-DU. When the IAB-donor-DU receives an IP packet, the IAB-donor-DU may then decide how to route the traffic based on the IP header and the downlink mapping configuration. The downlink mapping configuration indicates a mapping between the IP header fields (destination IP address, DCSP and/IPv6 flow label) and a BAP routing ID. The IAB-donor-DU inserts a BAP header to the packet that carries the BAP routing ID. The IAB-donor-DU further determines based on a routing configuration a mapping between the BAP routing ID and an egress link along which the IAB-donor-DU forwards the BAP packet. The IAP-donor-DU further determines an egress RLC channel based on the IP header and the downlink mapping configuration. The IAP-donor-DU transmits the BAP packet to the IAB-node 1. The IAB-node 1 determines that the BAP address, which may be part of the BAP routing ID and carried in the BAP header, does not match its own BAP address (i.e., there is a BAP address mismatch), and based on the BAP routing ID and a routing configuration, determines the egress link for transmitting the BAP packet. Based on the ingress RLC channel and a channel mapping configuration, the IAB-node 1 determines the egress RLC channel. The IAB-node 1 then transmits the IP packet through the determined link and the egress RLC channel to the IAB-node 4. The same process is followed for IAB-node 4 and IAB-node 5, where IAB-node 5 determines a BAP address match, removes the BAP header, and forwards the IP packet to upper layer processing for transmission to a UE.

For UL packet processing 800, based on the traffic type and an uplink mapping configuration, the IAB-node 5 determines a BAP routing ID, and inserts into the BAP header the BAP routing ID. Based on the BAP routing ID and a routing configuration, the IAB-node 5 determines an egress link, and based on the traffic type, determines an egress RLC channel. The IAB-node 5 transmits the IP packet to the IAB-node 4 based on the determined egress link and egress RLC channel. The IAB-node 4 determines based on the BAP routing ID and a routing configuration the egress link, and based on the ingress RLC channel and a routing configuration, determines the egress RLC channel. The IAB-node 4 transmits the BAP packet to the IAB-node 1 based on the determined egress link and egress RLC channel. The same process is followed by IAB-node 1, and the IP packet is ultimately received and processed by the IAB-donor where there is a BAP address match.

Figure 9:
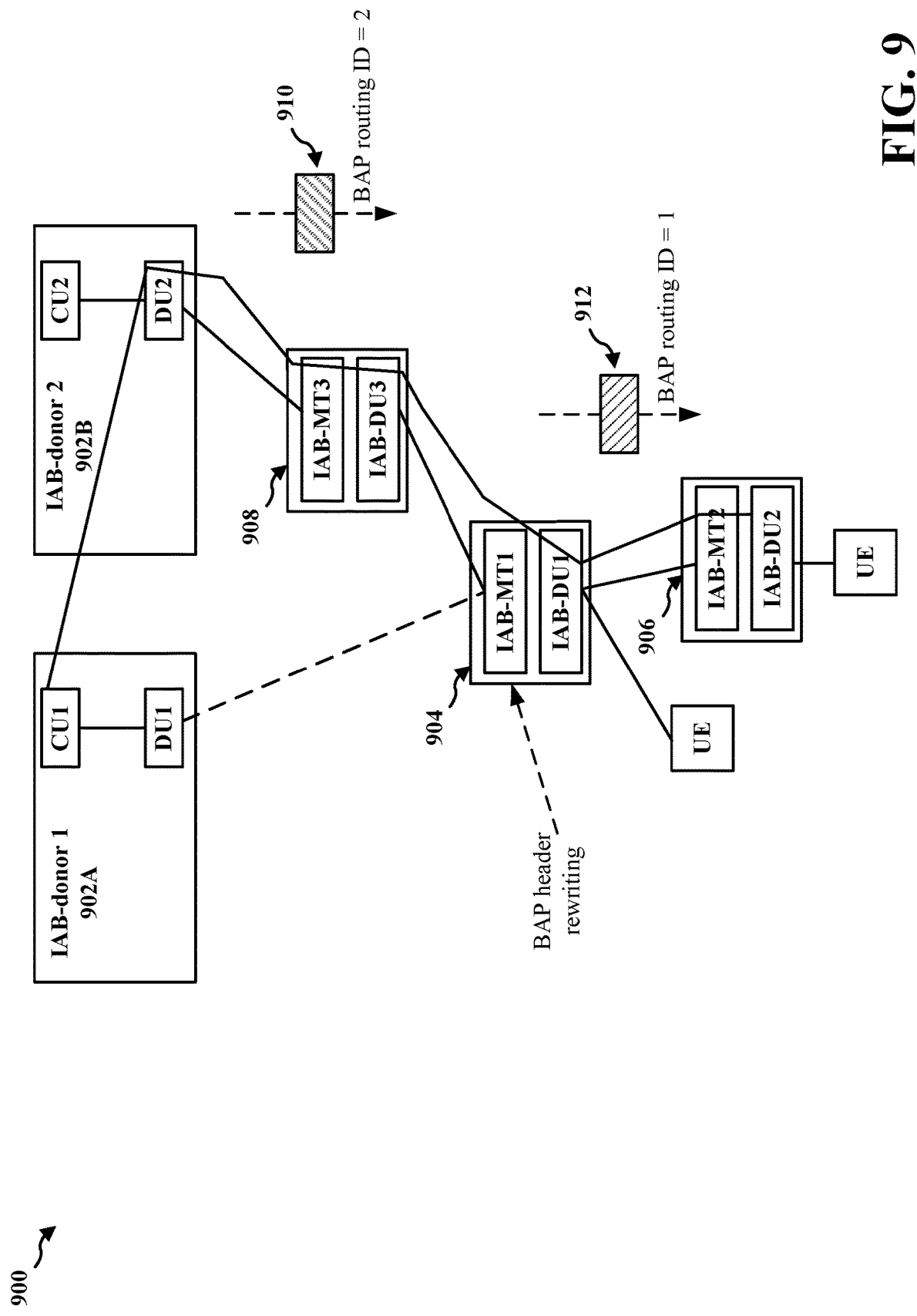
FIG. 9 illustrates example topological redundancy for IAB donors.

FIG. 9 illustrates example topological redundancy 900 for IAB donors. An IAB-node may be connected to one or more IAB-donors. As illustrated in FIG. 9, IAB-MT1 of IAB-node 1 904 may be dual-connected to CU1 of IAB-donor 1 902A and CU2 of IAB-donor 2 902B. IAB-DU1 may be connected to the CU2 of the IAB-donor 2 902B. Children node of IAB-node 1, such as IAB-node 2 may be connected to CU1 of IAB-donor 1 902A. IAB-node 3 908 may be connected to the CU2 of the IAB-donor 2 902B. CU1 of the IAB-donor 1 902A may route Fl-U traffic over a secondary path via a donor-DU associated with CU2 of the IAB-donor 2 902B to facilitate load-balancing or redundancy between the IAB-donors. Aspects provided herein facilitate the CU1 of IAB-donor 1 902A to configure QoS mapping for traffic routed over CU2-associated topology and facilitate CU2 of IAB-donor 2 902B to configure routing path with appropriate QoS for CU1-associated traffic. Similarly, an MT1 may be single-connected to parent DU3 908 and CU2 902B while IAB-node 1 and/or the UEs are connected to the first donor 902A. For example, for topology adaptation, MT1 may migrate from the first donor to the second donor, where at least one of the UEs or child/descendant MTs is not yet migrated to the second donor The backhaul routing path shown in FIG. 9 carries traffic between CU1 and IAB-node 2 and includes along the path donor-DU2, IAB-node 3 908, and IAB-node 1 904. Thus, the backhaul routing path extends over topology sections that may be managed by different CUs. For example, in some aspects, CU1 may manage the backhaul transport for the topology section to the southbound of IAB-node 1 904 (e.g. between IAB-node 1 904 and IAB-node 2 906). In some aspects, CU2 may manage the backhaul transport for the topology section to the northbound of IAB-node 1 904 (e.g. between IAB-node 1 904 and IAB-node 3 908 or between IAB-node 3 908 and donor-DU2).

Each of the two CUs may not be aware of the topology for the other section managed by the other CU. If a single BAP routing ID is configured for the path that extends over the two topology sections, this BAP routing ID may be selected by either CU1 or CU2. If the BAP routing ID is selected by CU1, CU1 may ensure that the selected BAP routing ID does not conflict with another BAP routing ID within the section managed by CU1 (which may be more elaborate than the example shown in FIG. 9). However, in some aspects, the selected BAP routing ID may conflict with another BAP routing ID used in the topology section managed by CU2 (which may also be more elaborate than the example shown in FIG. 9). Similarly, if the BAP routing ID for the inter-domain backhaul routing path of FIG. 9 is selected by CU2, CU2 may ensure that the selected BAP routing ID does not conflict with another BAP routing ID within the section managed by CU2, but in some aspects may still conflict with one used within the section managed by CU1.

As such, it may be advantageous to break the backhaul routing path into two portions, one per topology section. The first portion extends between IAB-node 1 904 and IAB-node 2 906, and this portion can be allocated a BAP routing ID by CU1. The second portion extends between IAB-node 1 904 and donor-DU2, and this portion may be allocated a BAP routing ID by CU2. In some aspects, the IAB-node 1 904 may perform header rewriting, such that the IAB-node 1 904 modifies a BAP routing ID (e.g., BAP routing ID=2 910) of a packet that it receives on the second portion to another BAP routing ID (e.g., BAP routing ID=1 912) to be used on the first portion. The header rewriting may be based on a configuration that may be configured by CU1 or CU2. The configuration indicates a mapping between the two BAP routing IDs. A similar example applies for an upstream packet.

A similar scenario occurs in topology adaptation, where in one example MT1 is initially connected to donor-DU1 of FIG. 9 and then switches parents to IAB-node 3. Any of the child/descendant UEs/MTs of IAB-node 1 may still not have migrated to the second donor, in which case inter-domain BAP routing may again be needed. In some aspects, traffic associated with IAB-donor 1 902A that is routed via the topology associated with IAB-donor 2 902B may be for multiple destination IAB-nodes associated with IAB-donor 1 902A, of which IAB-node 2 906 may be one of the multiple destinations. The other destination IAB-nodes may be child or descendant IAB-nodes of IAB-node 1 904. With regards to the flow of traffic in the downlink direction, this downlink traffic may follow the same or different physical path between IAB-donor-DU2 902B and IAB-node 1 904 for the different destinations. In order for the IAB-node 1 904 to perform header rewriting and properly map traffic to the proper outgoing BAP routing ID (e.g., ID 912) for the different destinations, the traffic received by IAB-node 1 904 from IAB-donor-DU2 902B may carry different incoming BAP routing IDs (e.g., ID 910), which may or may not include in part a destination BAP address of IAB-node 1 904. In some aspects, for example, where traffic for different destination IAB-nodes follow one physical path (e.g., same chain of IAB-nodes) between IAB-donor-DU2 902B and IAB-node 1 904, this path may be assigned multiple BAP routing IDs. In some aspects, the multiple BAP routing IDs may or may not carry a destination BAP address of IAB-node 1 904. In aspects where the multiple BAP routing IDs carry a destination BAP address of IAB-node 1 904, this node may have one or more destination BAP addresses. In some aspects, the multiple BAP routing IDs may have the same path ID or different path IDs. The different path IDs may correspond to the same physical path.

Aspects provided herein provide a configuration to rewrite BAP headers in IAB networks. For example, a first base station may be configured to modify a mapping configuration between BAP routing IDs. The first base station may be an IAB-node.

In some aspects, the IAB-node may receive, from a pre-hop node, a packet that carries a first routing ID. The IAB-node may modify the header of the packet to carry a second routing ID based on a routing configuration (e.g., header rewriting configuration) that maps the first routing identifier to a second routing identifier. The IAB-node may determine a next-hop node based on the second routing ID. The IAB-node may send the packet to the next-hop node. A second base station may comprise an IAB-donor node. The IAB-donor node may indicate to the IAB-node to modify the header of a packet that carries a first routing identifier. The IAB-donor node may provide the IAB-node with a routing configuration (e.g., header rewriting configuration) that maps the first routing identifier to a second routing identifier. In some aspects, the packet may be an upstream packet or a downstream packet. In some aspects, the routing identifier may be a BAP routing ID. In some aspects, the header of the packet may be a BAP header. In some aspects, the IAB-node may receive the routing configuration from an IAB-donor-CU. In some aspects, the packet may be an upstream packet and the first routing identifier corresponds to a BAP route between an access IAB-node and the IAB-node, and the second routing identifier corresponds to a BAP route between the IAB-node and a donor-DU. In some aspects, the packet may be a downstream packet and the first routing identifier corresponds to a BAP route between a donor-DU and the IAB-node, and the second routing identifier corresponds to a BAP route between the IAB-node and an access IAB-node.

The BAP route that includes the next-hop node may be managed by a first IAB-donor-CU, and the BAP route that includes the pre-hop node may be managed by a second IAB-donor-CU. The first routing identifier may carry a BAP address of the IAB-node. Modifying the first routing identifier to a second routing identifier may comprise a change of destination BAP address of the packet. Modifying the first routing identifier to a second routing identifier may comprise a change of BAP path ID of the packet. The routing configuration (e.g., header rewriting configuration) may be based on an ingress BH RLC CH between the pre-hop node and the IAB-node. The routing configuration may indicate an egress BH RLC CH between the IAB-node and the next-hop node. The IAB-node may receive from a pre-hop node a packet that carries a third routing identifier. The IAB-node may forward the packet with the third routing identifier to a next-hop node based on the routing configuration. The IAB-node may receive the routing configuration over RRC signaling or F1 control plane (F1-C) signaling.

Figure 10:
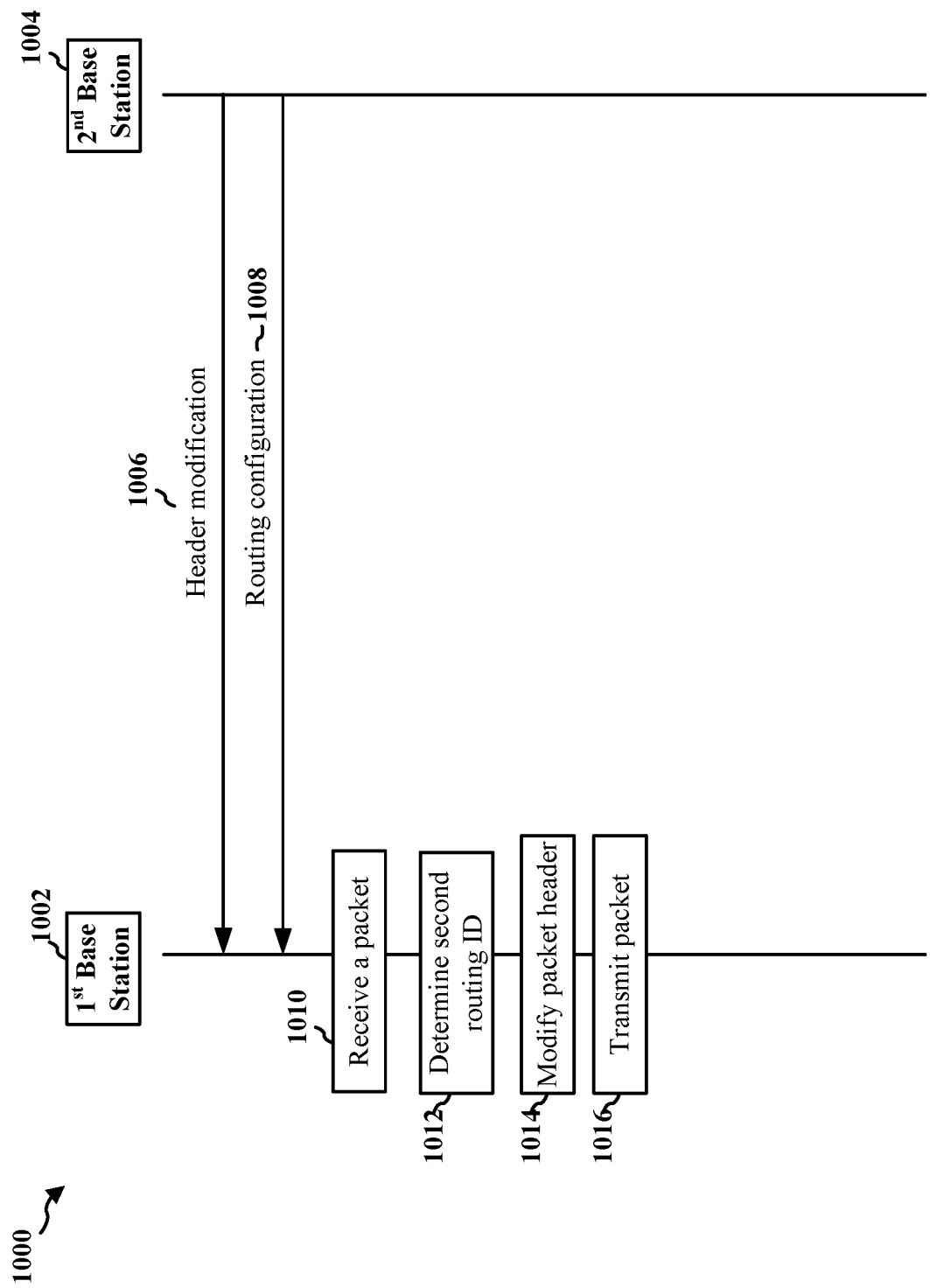
FIG. 10 is a call flow diagram of signaling between a first base station and a second base station.

FIG. 10 is a call flow diagram 1000 of signaling between a first base station 1002 and a second base station 1006. The first or second base stations 1002, 1004 may be configured to provide at least one cell. A UE may be configured to communicate with the first or second base stations 1002, 1004. For example, in the context of FIG. 1, the first or second base stations 1002, 1004 may correspond to base station 102/180 and, accordingly, the cell may include a geographic coverage area 110 in which communication coverage is provided and/or small cell 102' having a coverage area 110'. Further, a UE may correspond to at least UE 104. In another example, in the context of FIG. 3, the first or second base stations 1002, 1004 may correspond to base station 310 and the UE may correspond to UE 350.

As illustrated at 1006, the second base station 1004 may configure the first base station 1002 to modify a packet header of a packet. The second base station 1004 may configure the first base station 1002 to modify the packet header of the packet in which the packet header may indicate a first routing ID. The first base station 1002 may receive from the second base station 1004 a configuration to modify the packet header.

As illustrated at 1008, the second base station 1004 may transmit a routing configuration (e.g., header rewriting configuration) indicating a mapping between the first routing ID and a second routing ID. The second base station 1004 may transmit the routing configuration indicating the mapping between the first routing ID and the second routing ID to the first base station 1002. The first base station 1002 may receive the routing configuration from the second base station 1004. In some aspects, the first base station 1002 may be an IAB node and the second base station 1004 may be an IAB-donor node. In some aspects, the first routing ID may include a BAP address of the first base station 1002. In some aspects, the routing configuration (e.g., header rewriting configuration) may further indicate a mapping between an ingress backhaul RLC channel between a pre-hop node of the first base station 1002 and the first base station 1002. The packet may be received from the pre-hop node. The second routing ID may be determined based on the routing configuration mapping both the first routing ID and the ingress backhaul RLC channel to the second routing ID. The routing configuration may indicate, for the second routing ID, an egress backhaul RLC channel between the first base station 1002 and a next-hop node of the first base station 1002. The packet may be transmitted to the next-hop node through the egress backhaul RLC channel. In some aspects, the routing configuration may indicate, for the second routing ID, a mapping between an ingress backhaul RLC channel between a pre-hop node of the first base station 1002 and the first base station 1002, and an egress backhaul RLC channel between the first base station 1002 and a next-hop node of the first base station 1002. The packet may be received from the pre-hop node, and the packet may be transmitted to the next-hop node through the egress backhaul RLC channel. In some aspects, the routing configuration may be transmitted through one of RRC signaling or F1 control plane (F1-C) signaling.

As illustrated at 1010, the first base station 1002 may receive a packet with a packet header indicating the first routing ID. In some aspects, the packet may comprise a BAP packet. In some aspects, the packet header of the packet may comprise a BAP header. In some aspects, the packet may comprise one of an upstream packet or a downstream packet.

As illustrated at 1012, the first base station 1002 may determine the second routing ID. The first base station 1002 may determine the second routing ID based on the routing configuration (e.g., header rewriting configuration) mapping the first routing ID in the packet header to the second routing ID. In some aspects, the packet may comprise an upstream packet and the first routing ID may correspond to a first BAP route between an access IAB node and the first base station, the first base station being an IAB node. The access IAB node may have a signaling connection with the second base station 1004, and the second routing ID may correspond to a second BAP route between the first base station 1002 and an IAB-donor node. In some aspects, the IAB-donor node may be different than the second base station 1004. In some aspects, the first BAP route may be managed by the second base station 1004, and the second BAP route may be managed by the IAB-donor node. In some aspects, the packet may comprise a downstream packet and the first routing ID may correspond to a first BAP route between an IAB donor node and the first base station 1002, the first base station 1002 may be an IAB node. The second routing ID may correspond to a second BAP route between the first base station 1002 and an access IAB node, the access IAB node may have a signaling connection with the second base station 1004. In some aspects, the IAB-donor node may be different than the second base station 1004. In some aspects, the first BAP route may be managed by the IAB-donor node, and the second BAP route may be managed by the second base station 1004.

As illustrated at 1014, the first base station 1002 may modify the packet header. The first base station 1002 may modify the packet header to replace the first routing ID with the second routing ID. The first base station 1002 may modify the packet header to replace the first routing ID with the second routing ID based on a determination of the second routing ID. In some aspects, modifying the packet header to replace the first routing ID with the second routing ID may further comprise at least one of changing a destination BAP address of the packet, or changing a BAP path ID of the packet.

As illustrated at 1016, the first base station 1002 may transmit the packet based on the second routing ID. The packet may be transmitted to a next-hop node based on the second routing ID.

In some aspects, the first base station 1002 may receive a second packet. The first base station 1002 may receive the second packet with the packet header indicating a third routing ID. The first base station 1002 may receive the second packet from a pre-hop node of the first base station 1002.

In some aspects, the first base station 1002 may determine that the third routing ID may be excluded in the mapping for modification to a different routing ID. The first base station 1002 may determine based on the received routing configuration that the third routing ID may be excluded in the mapping for modification to a different routing ID within the routing configuration.

In some aspects, the first base station 1002 may forward the second packet to a next-hop node. The first base station 1002 may forward the second packet to a next-hop node based on the third routing ID.

Figure 11:
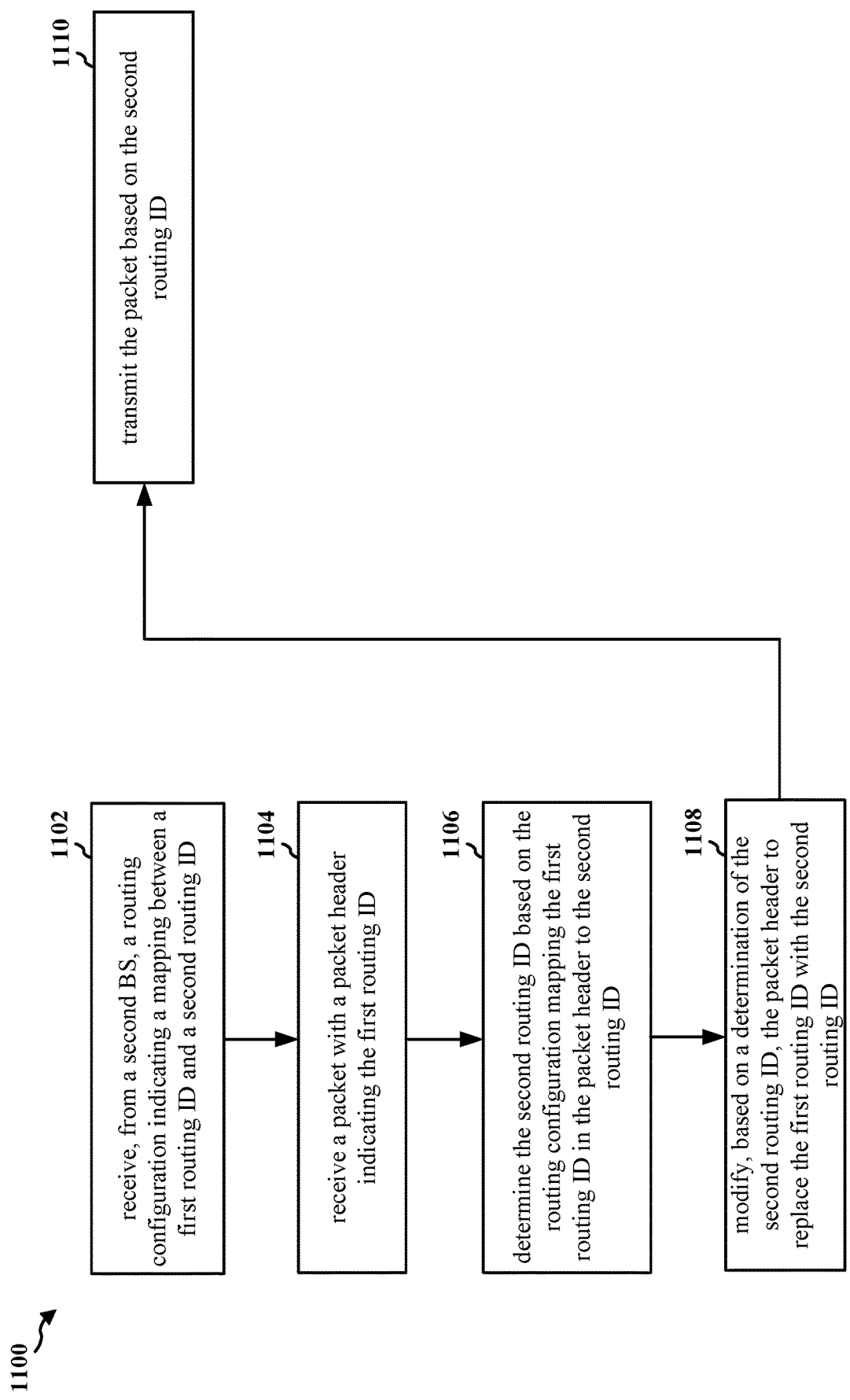
FIG. 11 is a flowchart of a method of wireless communication.

FIG. 11 is a flowchart 1100 of a method of wireless communication. The method may be performed by a base station or a component of a base station (e.g., the base station 102/180, 1002; the apparatus 1302; the baseband unit 1304, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to modify a mapping configuration between BAP routing IDs.

At 1102, the first base station may receive a routing configuration (e.g., header rewriting configuration). For example, 1102 may be performed by routing component 1340 of apparatus 1302. The first base station may receive the routing configuration indicating a mapping between a first routing ID and a second routing ID. The first base station may receive the routing configuration from a second base station. In some aspects, the first base station may be an IAB node and the second base station may be an IAB-donor node. In some aspects, the first routing ID may include a BAP address of the first base station. In some aspects, the routing configuration may further indicate a mapping between an ingress backhaul RLC channel between a pre-hop node of the first base station and the first base station. The packet may be received from the pre-hop node. The second routing ID may be determined based on the routing configuration mapping both the first routing ID and the ingress backhaul RLC channel to the second routing ID. The routing configuration may indicate, for the second routing ID, an egress backhaul RLC channel between the first base station and a next-hop node of the first base station. The packet may be transmitted to the next-hop node through the egress backhaul RLC channel. In some aspects, the routing configuration may indicate, for the second routing ID, a mapping between an ingress backhaul RLC channel between a pre-hop node of the first base station and the first base station, and an egress backhaul RLC channel between the first base station and a next-hop node of the first base station. The packet may be received from the pre-hop node, and the packet may be transmitted to the next-hop node through the egress backhaul RLC channel. In some aspects, the routing configuration may be received through one of RRC signaling or F1-C signaling.

At 1104, the first base station may receive a packet with a packet header indicating the first routing ID. For example, 1104 may be performed by packet component 1342 of apparatus 1302. In some aspects, the packet may comprise a BAP packet. In some aspects, the packet header of the packet may comprise a BAP header. In some aspects, the packet may comprise one of an upstream packet or a downstream packet.

At 1106, the first base station may determine the second routing ID. For example, 1106 may be performed by determination component 1344 of apparatus 1302. The first base station may determine the second routing ID based on the routing configuration mapping the first routing ID in the packet header to the second routing ID. In some aspects, the packet may comprise an upstream packet and the first routing ID may correspond to a first BAP route between an access IAB node and the first base station, the first base station being an IAB node. The access IAB node may have a signaling connection with the second base station, and the second routing ID may correspond to a second BAP route between the first base station and an IAB-donor node. In some aspects, the IAB-donor node may be different than the second base station. In some aspects, the first BAP route may be managed by the second base station, and the second BAP route may be managed by the IAB-donor node. In some aspects, the packet may comprise a downstream packet and the first routing ID may correspond to a first BAP route between an IAB donor node and the first base station, the first base station may be an IAB node. The second routing ID may correspond to a second BAP route between the first base station and an access IAB node, the access IAB node may have a signaling connection with the second base station. In some aspects, the IAB-donor node may be different than the second base station. In some aspects, the first BAP route may be managed by the IAB-donor node, and the second BAP route may be managed by the second base station.

At 1108, the first base station may modify the packet header. For example, 1108 may be performed by modify component 1346 of apparatus 1302. The first base station may modify the packet header to replace the first routing ID with the second routing ID. The first base station may modify the packet header to replace the first routing ID with the second routing ID based on a determination of the second routing ID. In some aspects, modifying the packet header to replace the first routing ID with the second routing ID may further comprise at least one of changing a destination BAP address of the packet, or changing a BAP path ID of the packet.

At 1110, the first base station may transmit the packet based on the second routing ID. For example, 1110 may be performed by transmission component 1334 of apparatus 1302. The packet may be transmitted to a next-hop node based on the second routing ID.

Figure 12:
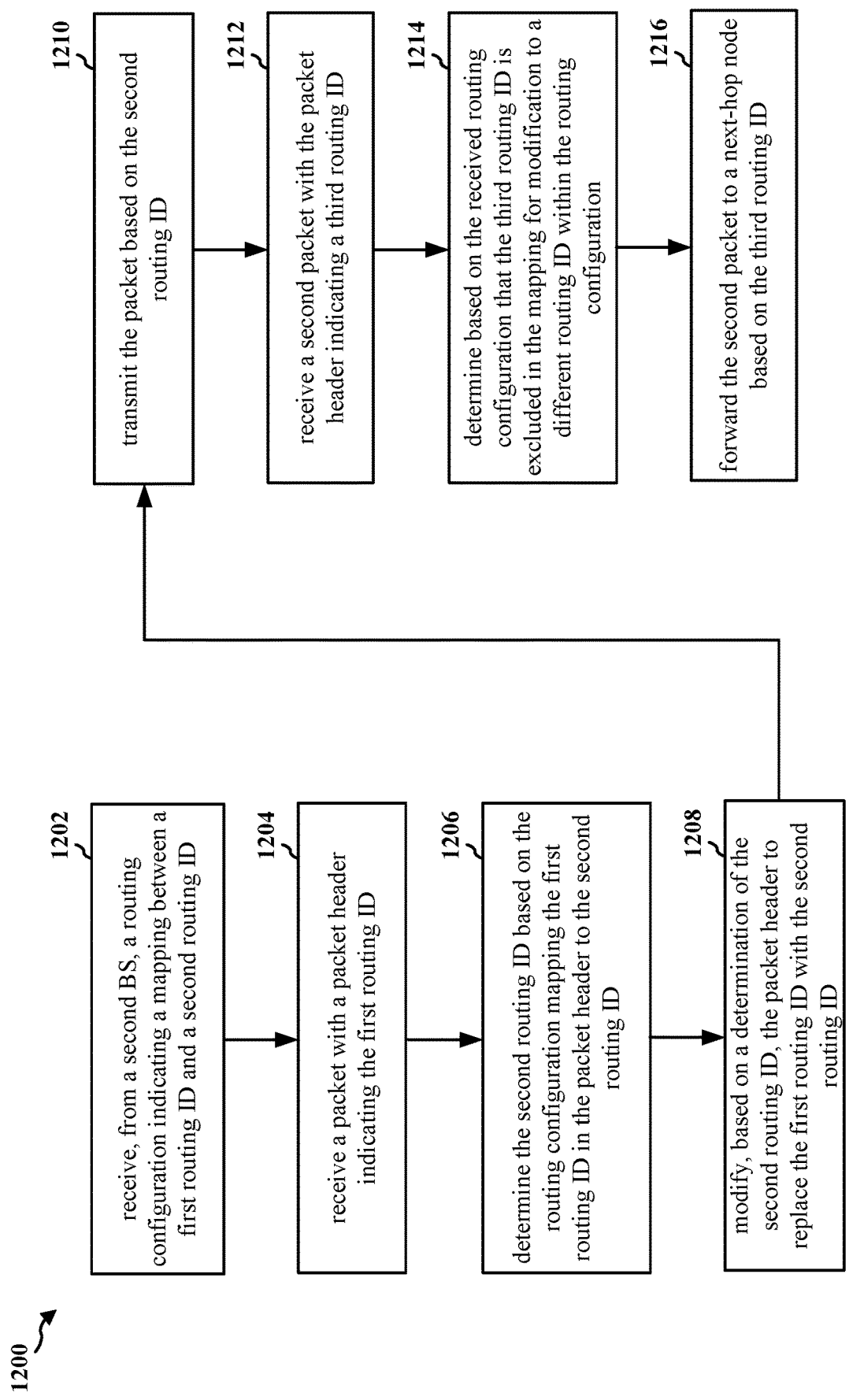
FIG. 12 is a flowchart of a method of wireless communication.

FIG. 12 is a flowchart 1200 of a method of wireless communication. The method may be performed by a base station or a component of a base station (e.g., the base station 102/180, 1002; the apparatus 1302; the baseband unit 1304, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to modify a mapping configuration between BAP routing IDs.

At 1202, the first base station may receive a routing configuration (e.g., header rewriting configuration). For example, 1202 may be performed by routing component 1340 of apparatus 1302. The first base station may receive the routing configuration indicating a mapping between a first routing ID and a second routing ID. The first base station may receive the routing configuration from a second base station. In some aspects, the first base station may be an IAB node and the second base station may be an IAB-donor node. In some aspects, the first routing ID may include a BAP address of the first base station. In some aspects, the routing configuration may further indicate a mapping between an ingress backhaul RLC channel between a pre-hop node of the first base station and the first base station. The packet may be received from the pre-hop node. The second routing ID may be determined based on the routing configuration mapping both the first routing ID and the ingress backhaul RLC channel to the second routing ID. The routing configuration may indicate, for the second routing ID, an egress backhaul RLC channel between the first base station and a next-hop node of the first base station. The packet may be transmitted to the next-hop node through the egress backhaul RLC channel. In some aspects, the routing configuration may indicate, for the second routing ID, a mapping between an ingress backhaul RLC channel between a pre-hop node of the first base station and the first base station, and an egress backhaul RLC channel between the first base station and a next-hop node of the first base station. The packet may be received from the pre-hop node, and the packet may be transmitted to the next-hop node through the egress backhaul RLC channel. In some aspects, the routing configuration may be received through one of RRC signaling or F1-C signaling.

At 1204, the first base station may receive a packet with a packet header indicating the first routing ID. For example, 1204 may be performed by packet component 1342 of apparatus 1302. In some aspects, the packet may comprise a BAP packet. In some aspects, the packet header of the packet may comprise a BAP header. In some aspects, the packet may comprise one of an upstream packet or a downstream packet.

At 1206, the first base station may determine the second routing ID. For example, 1206 may be performed by determination component 1344 of apparatus 1302. The first base station may determine the second routing ID based on the routing configuration mapping the first routing ID in the packet header to the second routing ID. In some aspects, the packet may comprise an upstream packet and the first routing ID may correspond to a first BAP route between an access IAB node and the first base station, the first base station being an IAB node. The access IAB node may have a signaling connection with the second base station, and the second routing ID may correspond to a second BAP route between the first base station and an IAB-donor node. In some aspects, the IAB-donor node may be different than the second base station. In some aspects, the first BAP route may be managed by the second base station, and the second BAP route may be managed by the IAB-donor node. In some aspects, the packet may comprise a downstream packet and the first routing ID may correspond to a first BAP route between an IAB donor node and the first base station, the first base station may be an IAB node. The second routing ID may correspond to a second BAP route between the first base station and an access IAB node, the access IAB node may have a signaling connection with the second base station. In some aspects, the IAB-donor node may be different than the second base station. In some aspects, the first BAP route may be managed by the IAB-donor node, and the second BAP route may be managed by the second base station.

At 1208, the first base station may modify the packet header. For example, 1208 may be performed by modify component 1346 of apparatus 1302. The first base station may modify the packet header to replace the first routing ID with the second routing ID. The first base station may modify the packet header to replace the first routing ID with the second routing ID based on a determination of the second routing ID. In some aspects, modifying the packet header to replace the first routing ID with the second routing ID may further comprise at least one of changing a destination BAP address of the packet, or changing a BAP path ID of the packet.

At 1210, the first base station may transmit the packet based on the second routing ID. For example, 1210 may be performed by transmission component 1334 of apparatus 1302. The packet may be transmitted to a next-hop node based on the second routing ID.

At 1212, the first base station may receive a second packet. For example, 1212 may be performed by packet component 1342 of apparatus 1302. The first base station may receive the second packet with the packet header indicating a third routing ID. The first base station may receive the second packet from a pre-hop node of the first base station.

At 1214, the first base station may determine that the third routing ID may be excluded in the mapping for modification to a different routing ID. For example, 1214 may be performed by determination component 1344 of apparatus 1302. The first base station may determine based on the received routing configuration that the third routing ID may be excluded in the mapping for modification to a different routing ID within the routing configuration.

At 1216, the first base station may forward the second packet to a next-hop node. For example, 1216 may be performed by transmission component 1334 of apparatus 1302. The first base station may forward the second packet to a next-hop node based on the third routing ID.

Figure 13:
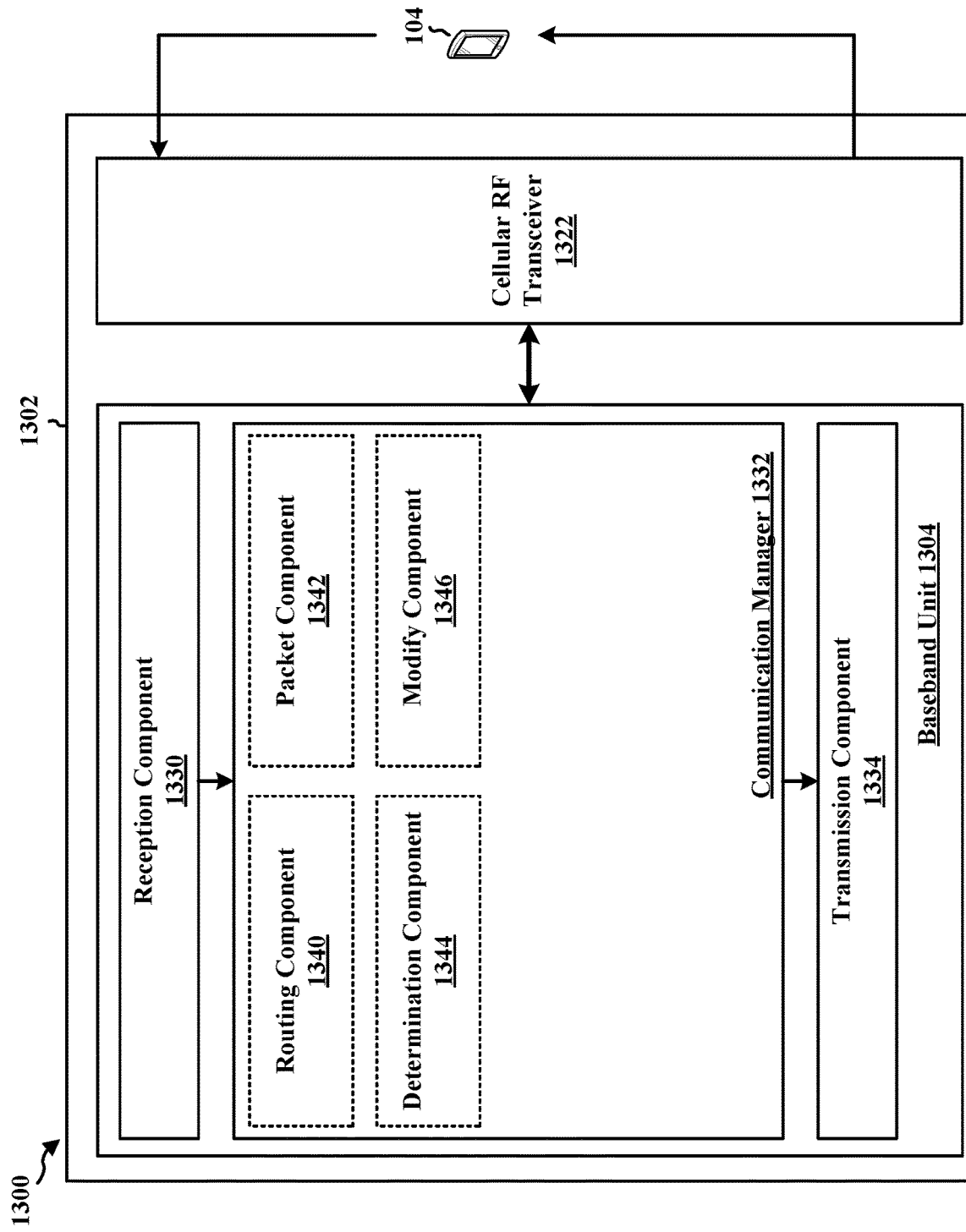
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1302 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a routing component 1340 that may receive a routing configuration, e.g., as described in connection with 1102 of FIG. 11 or 1202 of FIG. 12. The communication manager 1332 further includes a packet component 1342 that may receive a packet with a packet header indicating the first routing ID, e.g., as described in connection with 1104 of FIG. 11 or 1204 of FIG. 12. The packet component 1342 may be configured to receive a second packet, e.g., as described in connection with 1212 of FIG. 12. The communication manager 1332 further includes a determination component 1344 that may determine the second routing ID, e.g., as described in connection with 1106 of FIG. 11 or 1206 of FIG. 12. The determination component 1344 may be configured to determine that the third routing ID may be excluded in the mapping for modification to a different routing ID, e.g., as described in connection with 1214 of FIG. 12. The communication manager 1332 further includes a modify component 1346 that may modify the packet header, e.g., as described in connection with 1108 of FIG. 11 or 1208 of FIG. 12. The transmission component 1334 may be configured to forward the second packet to a next-hop node, e.g., as described in connection with 1216 of FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for receiving, from a second base station, a routing configuration indicating a mapping between a first routing ID and a second routing ID. The apparatus includes means for receiving a packet with a packet header indicating the first routing ID. The apparatus includes means for determining the second routing ID based on the routing configuration mapping the first routing ID in the packet header to the second routing ID. The apparatus includes means for modifying, based on a determination of the second routing ID, the packet header to replace the first routing ID with the second routing ID. The apparatus includes means for transmitting the packet based on the second routing ID. The apparatus further includes means for receiving a second packet with the packet header indicating a third routing ID. The apparatus further includes means for determining based on the routing configuration that the third routing ID is excluded in the mapping for modification to a different routing ID within the routing configuration. The apparatus further includes means for forwarding the second packet to a next-hop node based on the third routing ID. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 14:
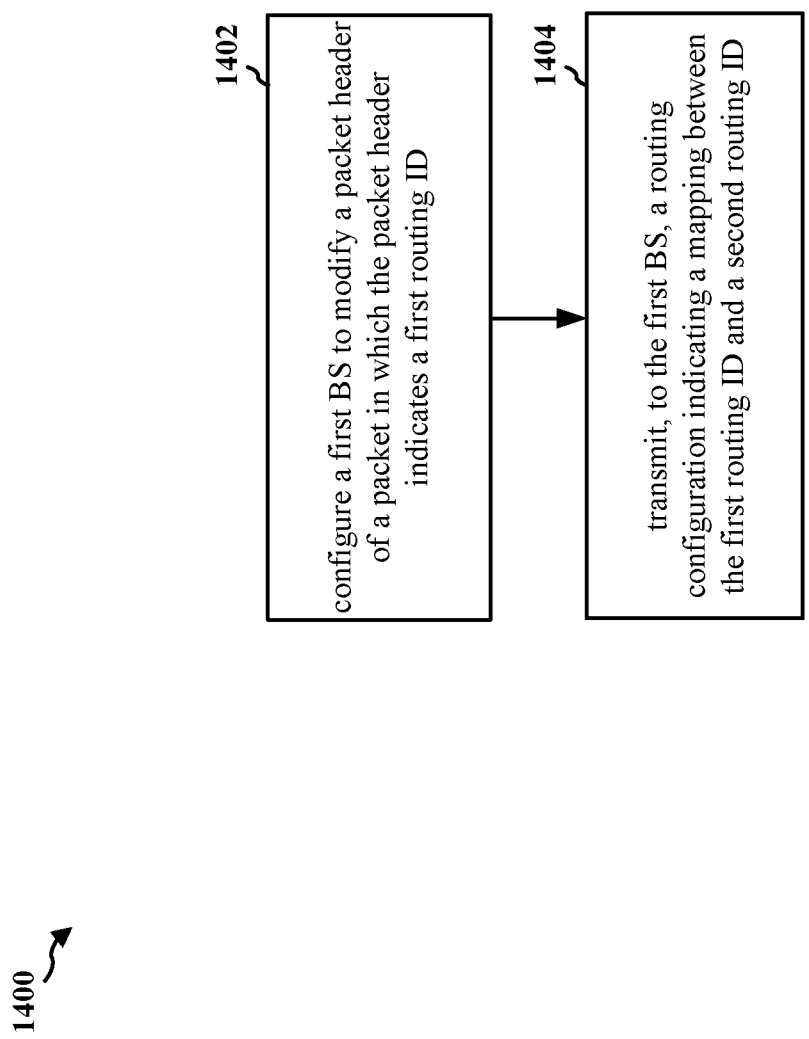
FIG. 14 is a flowchart of a method of wireless communication.

FIG. 14 is a flowchart 1400 of a method of wireless communication. The method may be performed by a base station or a component of a base station (e.g., the base station 102/180, 1004; the apparatus 1502; the baseband unit 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a base station to modify a mapping configuration between BAP routing IDs.

At 1402, the second base station may configure a first base station to modify a packet header of a packet. For example, 1402 may be performed by modify component 1540 of apparatus 1502. The second base station may configure a first base station to modify a packet header of a packet in which the packet header may indicate a first routing ID. In some aspects, the packet may comprise a BAP packet. In some aspects, the packet header of the packet may comprise a BAP header. In some aspects, the first base station may comprise an IAB node and the second base station may comprise an IAB-donor node. In some aspects, the packet may be one of an upstream packet or a downstream packet. In some aspects, the packet may be an upstream packet and the first routing ID may correspond to a first BAP route between an access IAB node and the first base station, the first base station being an IAB node. The access IAB node may have a signaling connection with the second base station. The second routing ID may correspond to a second BAP route between the first base station and an IAB-donor node. In some aspects, the IAB-donor node may be different than the second base station. In some aspects, the first BAP route may be managed by the second base station, and the second BAP route may be managed by the IAB-donor node. In some aspects, the packet may be a downstream packet and the first routing ID may correspond to a first BAP route between an IAB donor node and the first base station, the first base station being an IAB node. The second routing ID may correspond to a second BAP route between the first base station and an access IAB node. The access IAB node may have a signaling connection with the second base station. The IAB-donor node may be different than the second base station. In some aspects, the first BAP route may be managed by the IAB-donor node, and the second BAP route may be managed by the second base station. In some aspects, the first routing ID may include a BAP address of the first base station.

At 1404, the second base station may transmit a routing configuration (e.g., header rewriting configuration) indicating a mapping between the first routing ID and a second routing ID. For example, 1404 may be performed by routing component 1542 of apparatus 1502. The second base station may transmit the routing configuration indicating the mapping between the first routing ID and the second routing ID to the first base station. In some aspects, the routing configuration may be transmitted through one of RRC signaling or F1-C signaling.

Figure 15:
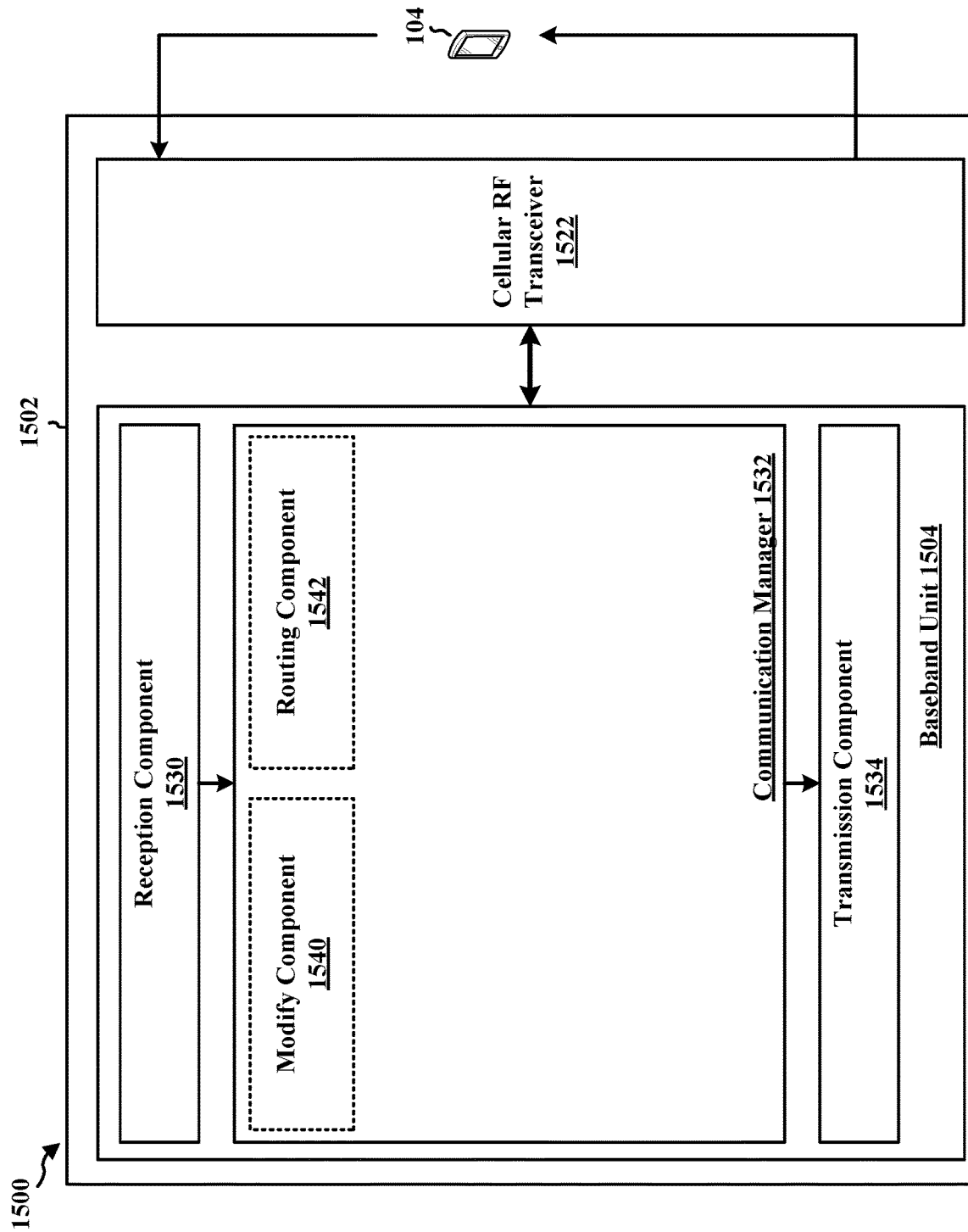
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a modify component 1540 that may configure a first base station to modify a packet header of a packet, e.g., as described in connection with 1402 of FIG. 14. The communication manager 1532 further includes a routing component 1542 that may transmit a routing configuration indicating a mapping between the first routing ID and a second routing ID, e.g., as described in connection with 1404 of FIG. 14.

The apparatus may include additional components that perform each of the blocks of the algorithm in the flowchart of FIG. 14. As such, each block in the flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for configuring a first base station to modify a packet header of a packet in which the packet header indicates a first routing ID. The apparatus includes means for transmitting, to the first base station, a routing configuration indicating a mapping between the first routing ID and a second routing ID. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first base station including at least one processor coupled to a memory and configured to receive, from a second base station, a routing configuration indicating a mapping between a first routing ID and a second routing ID; receive a packet with a packet header indicating the first routing ID; determine the second routing ID based on the routing configuration mapping the first routing ID in the packet header to the second routing ID; modify, based on a determination of the second routing ID, the packet header to replace the first routing ID with the second routing ID; and transmit the packet based on the second routing ID.

Aspect 2 is the apparatus of aspect 1, further including a transceiver coupled to the at least one processor.

Aspect 3 is the apparatus of any of aspects 1 and 2, further includes that the packet is a BAP packet.

Aspect 4 is the apparatus of any of aspects 1-3, further includes that the packet header of the packet is a BAP header.

Aspect 5 is the apparatus of any of aspects 1-4, further includes that the packet is one of an upstream packet or a downstream packet.

Aspect 6 is the apparatus of any of aspects 1-5, further includes that the packet is the upstream packet and the first routing ID corresponds to a first BAP route between an access IAB node and the first base station, the first base station being an IAB node, the access IAB node having a signaling connection with the second base station, and the second routing ID corresponds to a second BAP route between the first base station and an IAB-donor node.

Aspect 7 is the apparatus of any of aspects 1-6, further includes that the IAB-donor node is different than the second base station.

Aspect 8 is the apparatus of any of aspects 1-7, further includes that the first BAP route is managed by the second base station, and the second BAP route is managed by the IAB-donor node.

Aspect 9 is the apparatus of any of aspects 1-8, further includes that the packet is the downstream packet and the first routing ID corresponds to a first BAP route between an IAB donor node and the first base station, the first base station being an IAB node, and the second routing ID corresponds to a second BAP route between the first base station and an access IAB node, the access IAB node having a signaling connection with the second base station.

Aspect 10 is the apparatus of any of aspects 1-9, further includes that the IAB-donor node is different than the second base station.

Aspect 11 is the apparatus of any of aspects 1-10, further includes that the first BAP route is managed by the IAB-donor node, and the second BAP route is managed by the second base station.

Aspect 12 is the apparatus of any of aspects 1-11, further includes that the first routing ID includes a BAP address of the first base station.

Aspect 13 is the apparatus of any of aspects 1-12, further includes that the modifying the packet header to replace the first routing ID with the second routing ID further comprises at least one of changing a destination BAP address of the packet, or changing a BAP path ID of the packet.

Aspect 14 is the apparatus of any of aspects 1-13, further includes that the routing configuration further indicates a mapping between an ingress backhaul RLC channel between a pre-hop node of the first base station and the first base station, the packet is received from the pre-hop node, and the second routing ID is determined based on the routing configuration mapping both the first routing ID and the ingress backhaul RLC channel to the second routing ID.

Aspect 15 is the apparatus of any of aspects 1-14, further includes that the routing configuration indicates, for the second routing ID, an egress backhaul RLC channel between the first base station and a next-hop node of the first base station, and the packet is transmitted to the next-hop node through the egress backhaul RLC channel.

Aspect 16 is the apparatus of any of aspect 1-15, further includes that the routing configuration indicates, for the second routing ID, a mapping between an ingress backhaul RLC channel between a pre-hop node of the first base station and the first base station, and an egress backhaul RLC channel between the first base station and a next-hop node of the first base station, the packet being received from the pre-hop node, and the packet is transmitted to the next-hop node through the egress backhaul RLC channel.

Aspect 17 is the apparatus of any of aspects 1-16, further includes that the at least one processor is further configured to receive a second packet with the packet header indicating a third routing ID; determine based on the routing configuration that the third routing ID is excluded in the mapping for modification to a different routing ID within the routing configuration; and forward the second packet to a next-hop node based on the third routing ID.

Aspect 18 is the apparatus of any of aspects 1-17, further includes that the routing configuration is received through one of RRC signaling or F1-C signaling.

Aspect 19 is a method of wireless communication for implementing any of aspects 1-18.

Aspect 20 is an apparatus for wireless communication including means for implementing any of aspects 1-18.

Aspect 21 is a computer-readable medium storing computer executable code, where the code when executed by a processor causes the processor to implement any of aspects 1-18.

Aspect 22 is an apparatus for wireless communication at a second base station including at least one processor coupled to a memory and configured to configure a first base station to modify a packet header of a packet in which the packet header indicates a first routing ID; and transmit, to the first base station, a routing configuration indicating a mapping between the first routing ID and a second routing ID.

Aspect 23 is the apparatus of aspect 22, further including a transceiver coupled to the at least one processor.

Aspect 24 is the apparatus of any of aspects 21 and 22, further includes that the packet is a BAP packet, wherein the packet header of the packet is a BAP header.

Aspect 25 is the apparatus of any of aspects 21-23, further includes that the packet is one of an upstream packet or a downstream packet.

Aspect 26 is the apparatus of any of aspects 21-24, further includes that the packet is the upstream packet and the first routing ID corresponds to a first BAP route between an access IAB node and the first base station, the first base station being an IAB node, the access IAB node having a signaling connection with the second base station, and the second routing ID corresponds to a second BAP route between the first base station and an IAB-donor node.

Aspect 27 is the apparatus of any of aspects 21-25, further includes that the IAB-donor node is different than the second base station.

Aspect 28 is the apparatus of any of aspects 21-26, further includes that the packet is the downstream packet and the first routing ID corresponds to a first BAP route between an IAB donor node and the first base station, the first base station being an IAB node, and the second routing ID corresponds to a second BAP route between the first base station and an access IAB node, the access IAB node having a signaling connection with the second base station.

Aspect 29 is the apparatus of any of aspects 21-27, further includes that the IAB-donor node is different than the second base station.

Aspect 30 is the apparatus of any of aspects 21-28, further includes that the first routing ID includes a BAP address of the first base station.

Aspect 31 is the apparatus of any of aspects 21-29, further includes that the routing configuration is transmitted through one of RRC signaling or F1-C signaling.

Aspect 32 is a method of wireless communication for implementing any of aspects 21-31.

Aspect 33 is an apparatus for wireless communication including means for implementing any of aspects 21-31.

Aspect 34 is a computer-readable medium storing computer executable code, where the code when executed by a processor causes the processor to implement any of aspects 21-31.

What is claimed is:

1. An apparatus for wireless communication at a first base station, comprising:
a memory; and
at least one processor coupled to the memory and configured to:
receive, from a second base station, a routing configuration indicating a mapping between a first routing identifier (ID) and a second routing ID;
receive a packet with a packet header indicating the first routing ID;
determine the second routing ID based on the routing configuration mapping the first routing ID in the packet header to the second routing ID;
modify, based on a determination of the second routing ID, the packet header to replace the first routing ID with the second routing ID; and
transmit the packet based on the second routing ID.

2. The apparatus of claim 1, further comprising a transceiver coupled to the at least one processor.

3. The apparatus of claim 1, wherein the packet is a backhaul adaptation protocol (BAP) packet.

4. The apparatus of claim 1, wherein the packet header of the packet is a backhaul adaptation protocol (BAP) header.

5. The apparatus of claim 1, wherein the packet is one of an upstream packet or a downstream packet.

6. The apparatus of claim 5, wherein the packet is the upstream packet and the first routing ID corresponds to a first backhaul adaptation protocol (BAP) route between an access integrated access backhaul (IAB) node and the first base station, the first base station being an IAB node, the access IAB node having a signaling connection with the second base station, and the second routing ID corresponds to a second BAP route between the first base station and an IAB-donor node.

7. The apparatus of claim 6, wherein the IAB-donor node is different than the second base station.

8. The apparatus of claim 6, wherein the first BAP route is managed by the second base station, and the second BAP route is managed by the IAB-donor node.

9. The apparatus of claim 5, wherein the packet is the downstream packet and the first routing ID corresponds to a first backhaul adaptation protocol (BAP) route between an integrated access backhaul (IAB) donor node and the first base station, the first base station being an IAB node, and the second routing ID corresponds to a second BAP route between the first base station and an access IAB node, the access IAB node having a signaling connection with the second base station.

10. The apparatus of claim 9, wherein the IAB-donor node is different than the second base station.

11. The apparatus of claim 9, wherein the first BAP route is managed by the IAB-donor node, and the second BAP route is managed by the second base station.

12. The apparatus of claim 1, wherein the first routing ID includes a backhaul adaptation protocol (BAP) address of the first base station.

13. The apparatus of claim 1, wherein the modifying the packet header to replace the first routing ID with the second routing ID further comprises at least one of changing a destination backhaul adaptation protocol (BAP) address of the packet, or changing a BAP path ID of the packet.

14. The apparatus of claim 1, wherein the routing configuration further indicates a mapping between an ingress backhaul radio link control (RLC) channel between a pre-hop node of the first base station and the first base station, the packet is received from the pre-hop node, and the second routing ID is determined based on the routing configuration mapping both the first routing ID and the ingress backhaul RLC channel to the second routing ID.

15. The apparatus of claim 14, wherein the routing configuration indicates, for the second routing ID, an egress backhaul RLC channel between the first base station and a next-hop node of the first base station, and the packet is transmitted to the next-hop node through the egress backhaul RLC channel.

16. The apparatus of claim 1, wherein the routing configuration indicates, for the second routing ID, a mapping between an ingress backhaul radio link control (RLC) channel between a pre-hop node of the first base station and the first base station, and an egress backhaul RLC channel between the first base station and a next-hop node of the first base station, the packet being received from the pre-hop node, and the packet is transmitted to the next-hop node through the egress backhaul RLC channel.

17. The apparatus of claim 1, wherein the at least one processor is further configured to:
   receive a second packet with the packet header indicating a third routing ID;
   determine based on the routing configuration that the third routing ID is excluded in the mapping for modification to a different routing ID within the routing configuration; and
   forward the second packet to a next-hop node based on the third routing ID.

18. The apparatus of claim 1, wherein the routing configuration is received through one of radio resource control (RRC) signaling or F1 control plane (F1-C) signaling.

19. The apparatus of claim 1, wherein the first base station comprises an integrated access backhaul (IAB) donor of an ingress backhaul radio link control (RLC) channel, wherein the second base station comprises an integrated access backhaul (IAB) donor of an egress backhaul radio link control (RLC) channel.

20. The apparatus of claim 19, wherein the IAB donor comprises a central unit (CU) and a distributed unit (DU).

21. A method of wireless communication of a first base station (BS), comprising:
   receiving, from a second base station, a routing configuration indicating a mapping between a first routing identifier (ID) and a second routing ID;
   receiving a packet with a packet header indicating the first routing ID;
   determining the second routing ID based on the routing configuration mapping the first routing ID in the packet header to the second routing ID;
   modifying, based on a determination of the second routing ID, the packet header to replace the first routing ID with the second routing ID; and
   transmitting the packet based on the second routing ID.

22. The method of claim 21, wherein the first base station comprises an integrated access backhaul (IAB) donor of an ingress backhaul radio link control (RLC) channel, wherein the second base station comprises an integrated access backhaul (IAB) donor of an egress backhaul radio link control (RLC) channel.

23. The method of claim 22, wherein the IAB donor comprises a central unit (CU) and a distributed unit (DU).

24. The method of claim 21, wherein the packet is one of an upstream packet or a downstream packet.

25. The method of claim 24, wherein the packet is the upstream packet and the first routing ID corresponds to a first backhaul adaptation protocol (BAP) route between an access integrated access backhaul (IAB) node and the first base station, the first base station being an IAB node, the access IAB node having a signaling connection with the second base station, and the second routing ID corresponds to a second BAP route between the first base station and an IAB-donor node.

26. The method of claim 24, wherein the packet is the downstream packet and the first routing ID corresponds to a first backhaul adaptation protocol (BAP) route between an integrated access backhaul (IAB) donor node and the first base station, the first base station being an IAB node, and the second routing ID corresponds to a second BAP route between the first base station and an access IAB node, the access IAB node having a signaling connection with the second base station.

27. The method of claim 21, wherein the routing configuration further indicates a mapping between an ingress backhaul radio link control (RLC) channel between a pre-hop node of the first base station and the first base station, the packet is received from the pre-hop node, and the second routing ID is determined based on the routing configuration mapping both the first routing ID and the ingress backhaul RLC channel to the second routing ID.

28. The method of claim 27, wherein the routing configuration indicates, for the second routing ID, an egress backhaul RLC channel between the first base station and a next-hop node of the first base station, and the packet is transmitted to the next-hop node through the egress backhaul RLC channel.

29. The method of claim 21, wherein the routing configuration indicates, for the second routing ID, a mapping between an ingress backhaul radio link control (RLC) channel between a pre-hop node of the first base station and the first base station, and an egress backhaul RLC channel between the first base station and a next-hop node of the first base station, the packet being received from the pre-hop node, and the packet is transmitted to the next-hop node through the egress backhaul RLC channel.

30. The method of claim 21, further comprising:
   receiving a second packet with the packet header indicating a third routing ID;
   determining based on the routing configuration that the third routing ID is excluded in the mapping for modification to a different routing ID within the routing configuration; and
   forwarding the second packet to a next-hop node based on the third routing ID.

* * * * *